US010230684B2

(12) United States Patent
Zheng

(10) Patent No.: US 10,230,684 B2
(45) Date of Patent: Mar. 12, 2019

(54) METHOD, APPARATUS, AND EDGE NODE CONTROLLER FOR ALLOCATING EDGE NODE

(71) Applicant: Huawei Technologies Co., Ltd., Shenzhen (CN)

(72) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1082 days.

(21) Appl. No.: 14/154,430

(22) Filed: Jan. 14, 2014

(65) Prior Publication Data

US 2014/0143428 A1 May 22, 2014

Related U.S. Application Data

(63) Continuation of application No. PCT/CN2012/073653, filed on Apr. 9, 2012.

(30) Foreign Application Priority Data

Jul. 14, 2011 (CN) .......................... 2011 1 0197491

(51) Int. Cl.
*H04L 29/12* (2006.01)
*H04L 29/06* (2006.01)
*H04W 12/08* (2009.01)

(52) U.S. Cl.
CPC .......... *H04L 61/15* (2013.01); *H04L 65/1036* (2013.01); *H04L 65/1073* (2013.01); *H04W 12/08* (2013.01); *H04L 61/2015* (2013.01)

(58) Field of Classification Search
CPC . H04L 61/15; H04L 61/2015; H04L 65/1036; H04L 65/1073; H04W 12/08
(Continued)

(56) References Cited

U.S. PATENT DOCUMENTS 8,151,082 B2 * 4/2012 Flynn .................... G06F 3/0613
711/202
8,605,603 B2 12/2013 Hill et al.
(Continued)

FOREIGN PATENT DOCUMENTS

CN 1750490 A 3/2006
CN 101047600 A 10/2007
(Continued)

OTHER PUBLICATIONS

Ford, Bryan. "Unmanaged Internet Protocol: taming the edge network management crisis." ACM SIGCOMM Computer Communication Review 34, No. 1 (2004): 93-98.*
Foreign Communication From a Counterpart Application, Chinese Application No. 201110197491.X, Chinese Office Action dated Feb. 25, 2015, 12 pages.
(Continued)

*Primary Examiner* — Cheikh T Ndiaye
*Assistant Examiner* — Melaku Y Habtemariam
(74) *Attorney, Agent, or Firm* — Conley Rose, P.C.

(57) ABSTRACT

A method, an apparatus, and an edge node controller for selecting an edge node. The edge node controller receives a service request message including a subscriber identifier; obtains the subscriber identifier in the service request message; queries a first mapping relationship between the subscriber identifier and an edge node address according to the subscriber identifier to obtain an edge node address corresponding to the subscriber identifier; and returns a service response message including the edge node address. A subscriber identifier carried in a service request message is used to query a first mapping relationship to obtain an edge node address, and a service response message carrying an address of an edge node selected for a subscriber is delivered, thereby reducing a processing process of identifying different edge nodes by an external server, improving the processing efficiency, and reducing the implementation complexity.

28 Claims, 25 Drawing Sheets

(58) Field of Classification Search
USPC ........................................ 709/226, 217, 232
See application file for complete search history.

(56) References Cited

U.S. PATENT DOCUMENTS

| | | | | |
|---|---|---|---|---|
| 2005/0018605 | A1* | 1/2005 | Foote | H04L 12/4641 370/230 |
| 2005/0243837 | A1* | 11/2005 | Boyd | H04L 45/00 370/395.52 |
| 2006/0187856 | A1* | 8/2006 | Booth, III | H04L 12/4641 370/254 |
| 2008/0186965 | A1* | 8/2008 | Zheng | H04L 12/4633 370/389 |
| 2009/0037607 | A1* | 2/2009 | Farinacci | H04L 12/4641 709/249 |
| 2009/0103533 | A1* | 4/2009 | Li | H04L 41/0226 370/389 |
| 2009/0135829 | A1* | 5/2009 | Zheng | H04L 12/4625 370/395.1 |
| 2009/0161677 | A1* | 6/2009 | Zheng | H04L 12/2856 370/392 |
| 2009/0172174 | A1* | 7/2009 | Zha | H04L 12/2874 709/228 |
| 2009/0259667 | A1 | 10/2009 | Wang et al. | |
| 2010/0189052 | A1* | 7/2010 | Kavanagh | H04L 29/12915 370/329 |
| 2010/0246406 | A1* | 9/2010 | Hill | H04L 41/0681 370/241.1 |
| 2010/0309784 | A1* | 12/2010 | Mihaly | H04L 12/5692 370/230 |
| 2012/0099861 | A1* | 4/2012 | Zheng | H04L 45/68 398/45 |
| 2012/0113864 | A1* | 5/2012 | Bosneag | H04L 29/12028 370/254 |

FOREIGN PATENT DOCUMENTS

| | | |
|---|---|---|
| CN | 101051980 A | 10/2007 |
| CN | 101123564 A | 2/2008 |
| CN | 101309197 A | 11/2008 |
| CN | 101442467 A | 5/2009 |
| CN | 101499951 A | 8/2009 |
| CN | 101919209 A | 12/2010 |
| WO | 2009092441 A1 | 7/2009 |

OTHER PUBLICATIONS

Foreign Communication From a Counterpart Application, PCT Application No. PCT/CN2012/073653, English Translation of Chinese Search Report dated Jul. 19, 2012, 2 pages.

Foreign Communication From a Counterpart Application, PCT Application No. PCT/CN2012/073653, English Translation of Chinese Written Opinion dated Jul. 19, 2012, 20 pages.

Partial English Translation and Abstract of Chinese Patent Application No. CN101047600A, Mar. 12, 2014, 6 pages.

Foreign Communication From a Counterpart Application, Chinese Application No. 201110197491.X, Chinese Office Action dated Aug. 5, 2014, 13 pages.

"Multi-service Broadband Network Architecture and Nodal Requirements," Broadband Forum, Issue 1, Sep. 2014, 97 pages.

Foreign Communication From a Counterpart Application, European Application No. 12792378.7, European Oral Proceedings dated Sep. 30, 2016, 7 pages.

"White Paper," XP55351771, Wikipedia, Mar. 5, 2017, 1 page.

English Translation of "White Paper," Wikipedia, Mar. 5, 2017, 1 page.

"Understanding DSLAM and BRAS Access Devices," XP55351771, White Paper, Agilent Technologies, Jan. 24, 2016, 16 pages.

"Power Consumption and Energy Efficiency in the Internet," XP11479968, IEEE Networks, Mar./Apr. 2011, 8 pages.

Foreign Communication From a Counterpart Application, European Application No. 12792378.7, European Notice of Rejection dated Mar. 15, 2017, 12 pages.

"Telecommunications and Internet converged Services and Protocols for Advanced Networking (TISPAN); NGN Functional Architecture; Network Attachment Sub-System (NASS)," ETSI ES 282 004, V3.4.1, ETSI Standard, XP014046256, Mar. 2010, 52 pages.

"Series Y: Global Information Infrastructure, Internet Protocol Aspects and Next-Generation Networks, Next Generation Networks—Quality of Service and Performance, Resource and admission control functions in next generation networks," XP017563719, ITU-T, Y.2111, Nov. 2008, 176 pages.

"3rd Generation Partnership Project; Technical Specification Group Services and Systems Aspects; General Packet Radio Service (GPRS) enhancements for Evolved Universal Terrestrial Radio Access Networks (E-UTRAN) access (Release 10)," XP050552991, 3GPP TS 23.401, V10.4.0, Technical Specification, Jun. 2011, 282 pages.

Foreign Communication From a Counterpart Application, European Application No. 12792378.7, Extended European Search Report dated Dec. 2, 2014, 10 pages.

* cited by examiner

METHOD, APPARATUS, AND EDGE NODE CONTROLLER FOR ALLOCATING EDGE NODE

CROSS-REFERENCE TO RELATED APPLICATIONS

This application is a continuation of International Application No. PCT/CN2012/073653, filed on Apr. 9, 2012, which claims priority to Chinese Patent Application No. 201110197491.X, filed on Jul. 14, 2011, both of which are hereby incorporated by reference in their entireties.

TECHNICAL FIELD

The present invention relates to the field of communications, and in particular, to a method, an apparatus, and an edge node controller for allocating an edge node.

BACKGROUND

FIG. 1 is a schematic diagram 1 of architecture of an access network. An existing access network is formed by an access node (AN) 91, an Internet Protocol (IP) edge node (EN) 92, an aggregation node 93, and an aggregation network 90.

For a wireless network, an EN is a wireless gateway, and an AN is a base station (BS). For a digital subscriber line (DSL) network, an EN is a broadband access server (BRAS)/broadband network gateway (BNG), and an AN is a digital subscriber line access multiplexer (DSLAM). For a passive optical network (PON), an EN is a BRAS/BNG, and an AN is an optical line terminal (OLT).

An existing EN (for example, BRAS/BNG) is deployed at a high position; therefore, a performance bottleneck exists in centralized deployment of ENs; however, for a service in a content delivery network (CDN), an EN is required to be closer to a subscriber.

FIG. 2 is a schematic diagram 2 of reference architecture of an access network. A subscriber management function and a service processing function of the EN in FIG. 1 may be separated to form two different network elements: a broadband service gateway (BSG) 94 and a BNG 95. The BSG is also called a Service BNG, and the BNG is used for subscriber management and is moved down to an edge of an aggregation network, for example, to the aggregation node 93 in FIG. 1, and then, is directly connected to the AN 91, or a BNG function may be also moved down to the AN (that is, the BNG and the AN are located on a physical device). The BSG is used for service processing, and can still be deployed at a high network position, and the BSG may be deployed at multiple stations to avoid the performance bottleneck. The BNG 95 and the BSG 94 are interconnected through an IP/multiprotocol label switching (MPLS) network 99 to form an EN subnet.

However, for management of an operator, the EN and the aggregation node or the AN are subordinate to different departments. If moving down of the BNG in the EN subnet causes a shock to management of an aggregation network department or an access department, all network management personnel of the aggregation network department or the access department need to have knowledge related to the BNG, which increases the labor costs and economic costs in operating. In addition, because the EN is evolved to two network elements, the BSG and the BNG, the number of devices that need to be managed is increased to a great extent, and at the same time, a difficulty is brought to an EN management department, and original EN management personnel need to re-manage BNG and BSG devices that are deployed in a distributed manner, which also increases the labor costs and time costs.

SUMMARY

Embodiments of the present invention relate to a method, an apparatus, and an edge node controller for selecting an edge node, which dynamically use a subscriber identifier carried in a service request message to query and obtain an address of an edge node selected for a subscriber, and deliver a service response message carrying an edge node address to remove the labor costs of statically configuring a mapping relationship between a subscriber and a BSG on a BNG, thereby reducing a processing process of identifying different edge nodes by an external device, improving the processing efficiency, and reducing the implementation complexity.

An embodiment of the present invention provides a method for allocating an edge node, where the method includes: receiving a service request message including a subscriber identifier; obtaining the subscriber identifier in the service request message; querying a first mapping relationship between the subscriber identifier and an edge node address according to the subscriber identifier to obtain an edge node address corresponding to the subscriber identifier; and returning a service response message including the edge node address.

An embodiment of the present invention provides a method for allocating an edge node, where the method includes: sending a service request message including a subscriber identifier; and receiving a service response message including an edge node address, where the edge node address is an edge node address corresponding to the subscriber identifier.

An embodiment of the present invention provides an apparatus for allocating an edge node, where the apparatus includes: a service request message receiving unit configured to receive a service request message including a subscriber identifier; an obtaining unit configured to obtain the subscriber identifier in the service request message; a query unit configured to query a first mapping relationship between the subscriber identifier and an edge node address according to the subscriber identifier to obtain an edge node address corresponding to the subscriber identifier; and a return unit configured to return a service response message including the edge node address.

An embodiment of the present invention provides an apparatus for allocating an edge node, where the apparatus includes: a sending unit configured to send a service request message including a subscriber identifier; and a receiving unit configured to receive a service response message including an edge node address, where the edge node address is an edge node address corresponding to the subscriber identifier.

An embodiment of the present invention provides an edge node controller, where the edge node controller includes: a selection unit configured to select an edge node for a subscriber from edge nodes under jurisdiction of a virtual edge node; a device management unit configured to configure an edge node address under jurisdiction of the virtual edge node; a mapping relationship establishment unit configured to establish a mapping relationship between a physical subscriber identifier and the edge node address; and a sending unit configured to send the edge node address corresponding to the physical subscriber identifier.

The method, the apparatus, and the edge node controller for selecting an edge node in the embodiments of the present invention use a physical subscriber identifier carried in a service request message to query and obtain an address of an edge node selected for a subscriber, and deliver a service response message carrying an edge node address, thereby reducing a processing process of identifying different edge nodes by an external device, improving the processing efficiency, and reducing the implementation complexity.

DESCRIPTION OF EMBODIMENTS

The technical solutions in the embodiments of the present invention are further described in detail in the following through the accompanying diagrams and embodiments.

Figure 1:
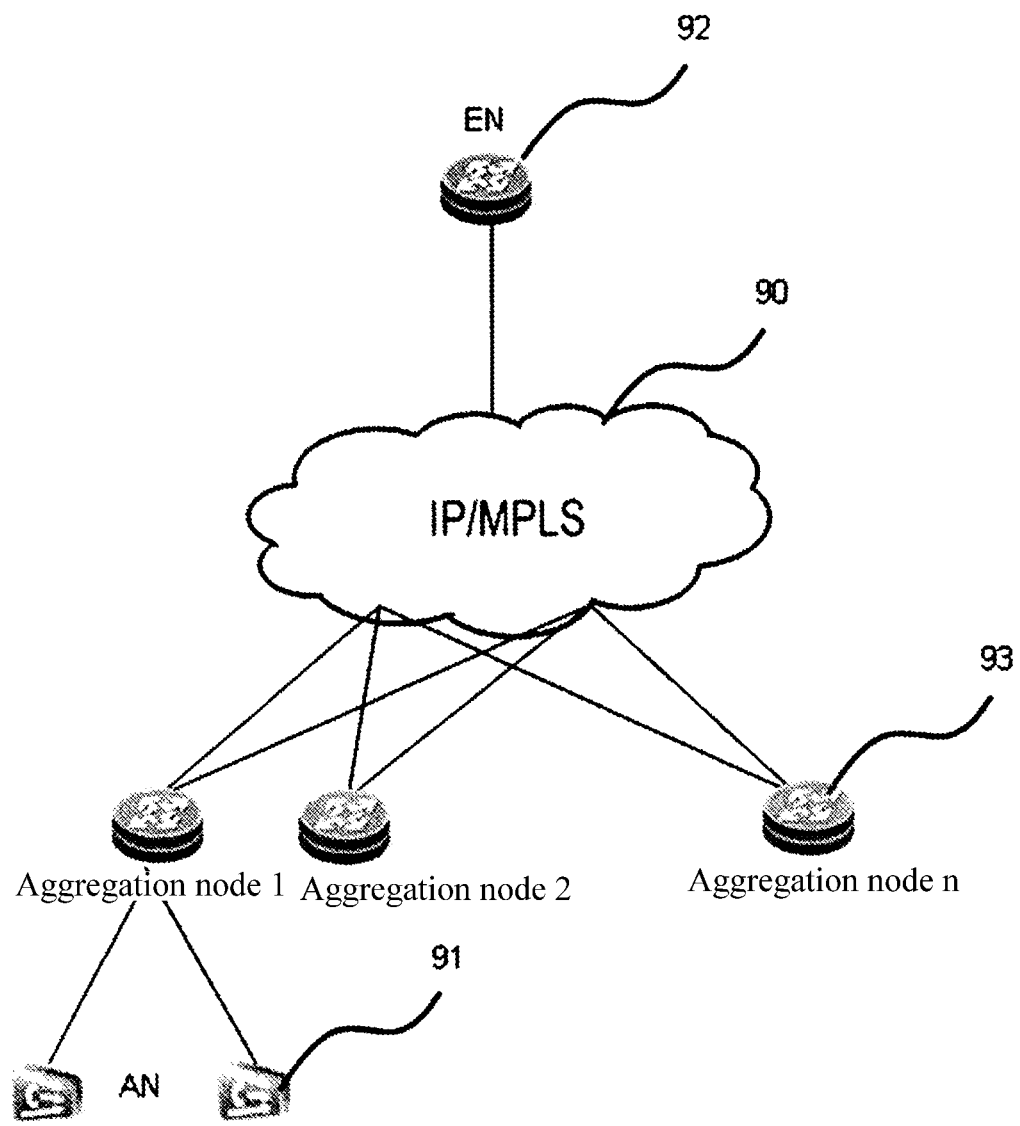
FIG. 1 is a schematic diagram 1 of architecture of an access network in the prior art.
Figure 2:
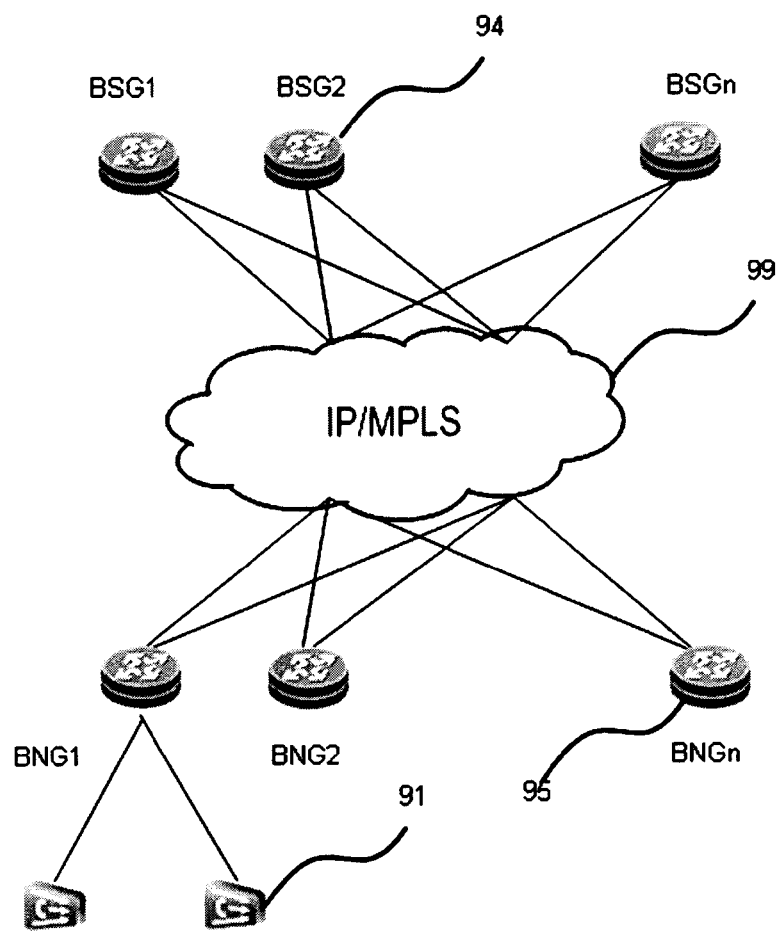
FIG. 2 is a schematic diagram 2 of reference architecture of an access network in the prior art.
Figure 3:
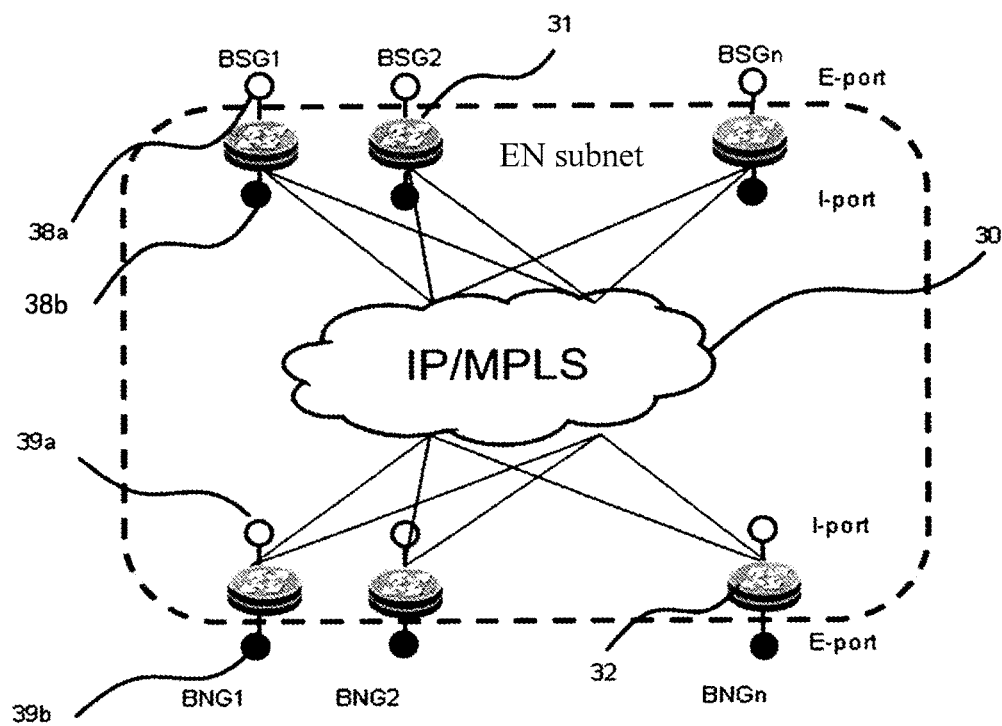
FIG. 3 is a physical schematic diagram of a network environment according to an embodiment of the present invention.
Figure 4:
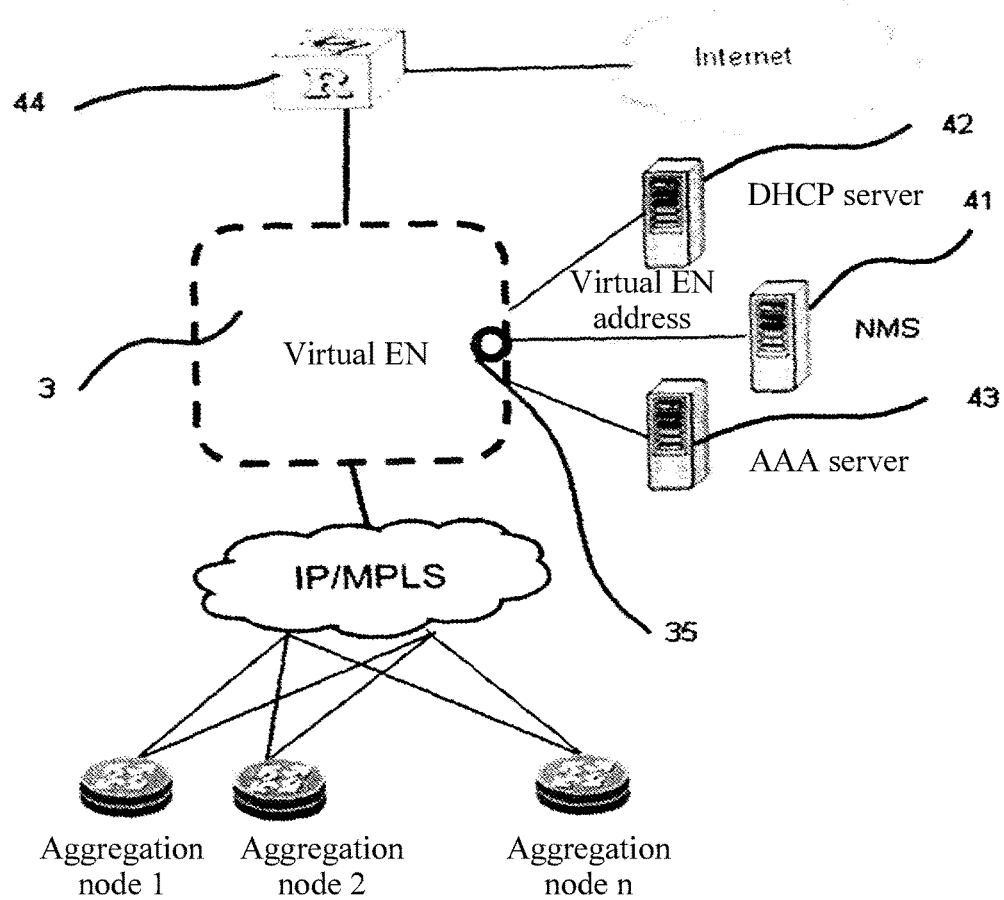
FIG. 4 is a logic diagram of a network environment according to an embodiment of the present invention.

According to the embodiments of the present invention, unified management is performed on an EN (a BNG and a BSG). FIG. 3 is a physical schematic diagram of a network environment according to an embodiment of the present invention, and FIG. 4 is a logic diagram of a network environment according to an embodiment of the present invention. As shown in the figures, a BSG 31 and a BNG 32 and an Internet IP/MPLS 30 of the BSG 31 and the BNG 32 are virtualized, by an EN controller 35, into a single network element being a virtual EN3. In this way, each BSG31/BNG32 is equivalent to a remote module of the virtual EN 3, so that a management shock caused by moving down the BNG 32 to an aggregation network department or an access department and a difficulty brought by distributed deployment of IP edge nodes are overcome.

The EN controller 35 may select at least one BSG for a subscriber from the virtual EN according to a subscriber/service policy or a load/fault condition of the BSG. A BSG address is delivered to the BNG and/or the subscriber through an authentication, authorization, and accounting (AAA) message or a dynamic host configuration protocol (DHCP) message, and a table of mapping between a subscriber and a physical BSG may be established on the BNG to implement routing and forwarding in the virtual EN.

As shown in FIG. 4, an external network management system (NMS) server 41, a DHCP server 42, an AAA server 43, and a core router 44 may view the virtual EN (EN subnet) 3 as a single network element. For example, the NMS server 41 manages the virtual EN 3 as a single network element, and the DHCP server 42/AAA server 43 of an operator also treats the virtual EN 3 as a single network element, so that the operation and maintenance costs of the operator are reduced and network management personnel may not perceive a change of distributed deployment of the IP edge nodes EN, and the virtual EN can support automatic decomposition from a service level agreement (SLA) of the subscriber to a parameter of the BNG/BSG to avoid increase of the operation and maintenance costs. At the same time, view separation between the virtual EN 3 and an aggregation node (or an access node) 40 is implemented.

Although device integration may be performed on a BNG function of the EN and the aggregation node (or access node) AN on a physical device, a BNG function of all integrated devices may be considered as a part of one virtual EN and is still managed by a BNG department, while an aggregation node function of all the integrated devices is still managed by an original aggregation network department (or access department) to avoid a management shock of moving down of the BNG to the aggregation network department (or the access department).

Each virtual EN may be formed by at least one physical IP edge node (BNG/BSG), and each virtual EN may have one or more virtual EN addresses. A data plane, a control plane, or a management plane of the virtual EN each may have one virtual EN address, or may share one virtual EN address. Each physical IP edge node (BNG/BSG) has its own external interface (E-port) address, an inline interface (I-port) address, and a loop back address. The virtual EN address and an address of the physical IP edge node may be different, or the virtual EN address may be set as an address of a physical IP edge node. As shown in FIG. 3, for a network-side external router of the virtual EN 3, addresses of external interfaces (E-port) 38a and 38b of the virtual EN3 are seen, and addresses of internal interfaces (I-port) 39a and 39b cannot be seen, and in the figure, the I-port39a and the E-port38b are subscriber side addresses, and the I-port39b and the E-port38a are network side addresses. As shown in FIG. 4, for the NMS server 41, the AAA server 43, and the DHCP server 42 of the operator, an address of the virtual EN 3 is seen, and an address of each BNG or BSG does not need to be seen.

Devices in the virtual EN may be connected through a tunnel (such as an MPLS tunnel, an IP tunnel, or a virtual local area network (VLAN) tunnel).

Figure 5:
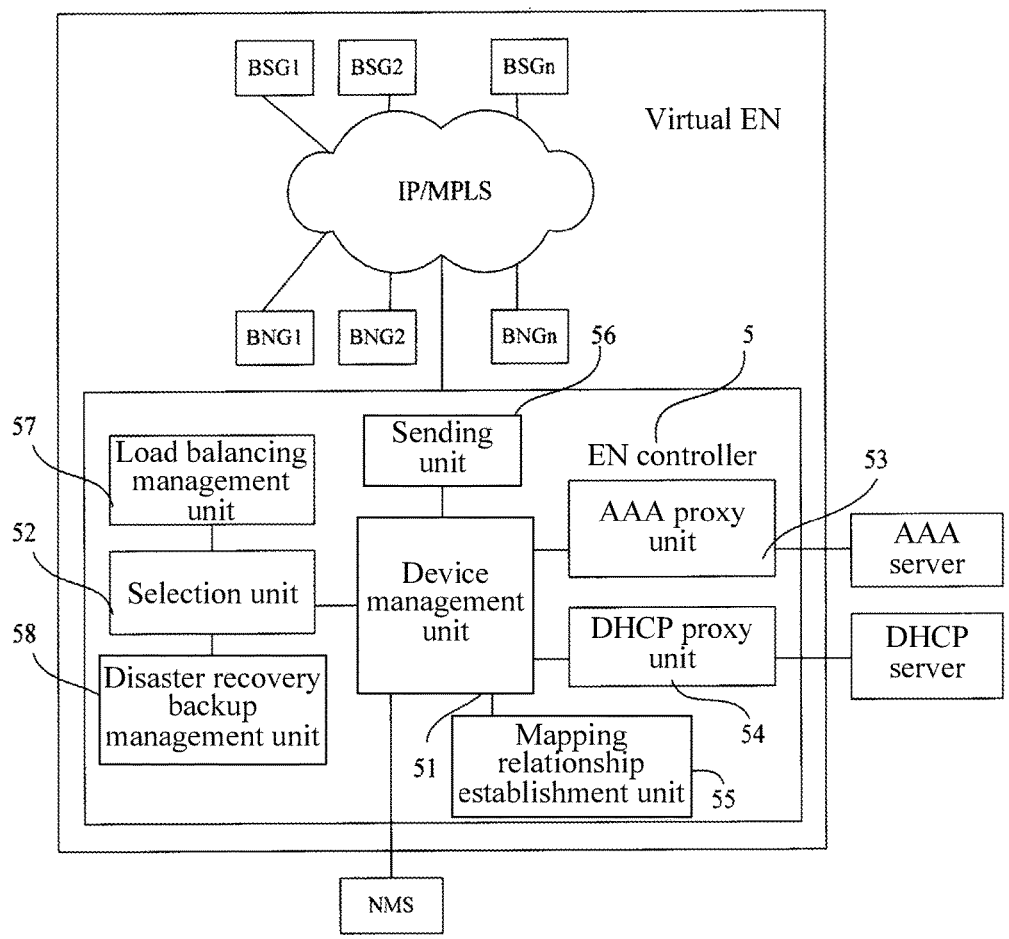
FIG. 5 is a schematic diagram of an edge node controller according to an embodiment of the present invention.

FIG. 5 is a schematic diagram of an edge node controller according to an embodiment of the present invention. As shown in the figure, an EN controller 5 in the embodiment of the present invention specifically includes a selection unit 52, a device management unit 51, an AAA proxy unit 53, a DHCP proxy unit 54, a mapping relationship establishment unit 55, and a sending unit 56.

The selection unit 52 selects a BSG or a BNG for a subscriber from a BSG or a broadband network gateway BNG under jurisdiction of an edge node, which may reflect unified management on the BSG and the BNG to facilitate disaster recovery or capacity expansion of a virtual EN.

The device management unit 51 is a core component in the controller, and is responsible for managing work of another unit. The device management unit 51 is connected to an NMS of an operator, presents multiple BNG and BSG devices as one network element device to the NMS; and address of each edge node in the virtual EN, for example, BNG and BSG, need to be statically or dynamically configured. By using a virtual EN technology, an actual physical port number (which may include a frame number, a single board slot number, and a physical port number) of each physical device belonging to the same virtual EN is mapped to a logic port number (including a frame number, a single board slot number, and a logic port number) of the virtual EN, that is, unified addressing is performed on a logic port of the virtual EN. Optionally, if a BNG function is set in an AN, unified addressing is performed on an access loop identifier in the virtual EN to establish correspondence between a physical access loop identifier (Access Loop ID, also called line ID or Access line ID) and a logic access loop identifier to implement conversion between the two.

The AAA proxy unit 53 is an optional unit and is configured to connect to an AAA server of the operator, send service request message to the AAA server, and receive a returned service response message to implement an AAA proxy or authenticator function, and can perform conversion between a physical subscriber identifier (such as a physical access loop identifier) and a logic subscriber identifier (such as a logic access loop identifier) and conversion between a virtual EN address and an address of the edge node such as the BNG/BSG. In this way, in an AAA authentication process, multiple BNGs are presented as one network element device to the AAA server. The AAA server can only see the virtual EN address or the logic access loop identifier, and the service response information includes a virtual address of the edge node, so that an address of a physical BNG/BSG or a physical access loop identifier are shielded for the AAA server; in this way, the AAA server cannot see increase of the number of physical BNGs/BSGs, and the network has a good expandability.

The DHCP proxy unit 54 is an optional unit, and is configured to connect to a DHCP server of the operator, send service request message to the DHCP server, and receive a returned service response message to implement a DHCP proxy or relay function, and can perform conversion between a physical subscriber identifier (such as a physical access loop identifier) and a logic subscriber identifier (such as a logic access loop identifier) and conversion between a virtual EN address and an address of the edge node such as the BNG/BSG. In this way, in a DHCP authentication process, multiple BSG/BNG devices are presented as one network element device to the DHCP server. Similarly, the DHCP server can only see the virtual EN address or the logic access loop identifier, and the service response information includes a virtual address of the edge node, so that an address of a physical BNG/BSG or a physical access loop identifier are shielded for the DHCP server; in this way, the DHCP server cannot see increase of the number of physical BNGs/BSGs, and the network has a good expandability.

The mapping relationship establishment unit 55 may establish a first mapping relationship between a physical access loop identifier and an address of the edge node such as the BSG. In this way, when a service request message including a physical access loop identifier and sent by the BNG or the subscriber is received, a corresponding BSG address may be obtained by querying, through the physical access loop identifier, the first mapping relationship, and then, the sending unit 56 sends the BSG address to the BNG or the subscriber.

As shown in FIG. 5, the edge node controller in the embodiment of the present invention further includes a load balancing management unit 57 and a disaster recovery backup management unit 58.

The load balancing management unit 57 is configured to collect a load condition of each device in the virtual EN.

The disaster recovery backup management unit 58 is configured to collect a fault condition of each device in the virtual EN. Optionally, information of the BSG/BNG is backed up in the disaster recovery backup management unit, and when a first BSG/BNG has a fault and switches the subscriber to a second BSG/BNG, the disaster recovery backup management unit may synchronize information of the first BSG/BNG to the second BSG/BNG.

In this way, the selection unit 52 may select at least one edge node such as a BSG for the subscriber from the virtual EN according to a subscriber or service policy, or select at least one physical BSG for the subscriber from the virtual EN according to a load condition of the BSG and according to a load balancing policy, or select at least one physical BSG for the subscriber from the virtual EN according to a fault condition of the BSG and according to a disaster recovery backup policy.

When multiple BSGs serve the same subscriber or the same service, a load balancing policy is that the selection unit 52 may perform load balancing according to a source address of a subscriber or a loop identifier, and select different BSGs for subscribers in different source address network segments, that is, different BSGs manage subscribers in different network segments, and furthermore, before performing the load balancing according to the source address of the subscriber or the loop identifier, may first select BSGs of different service types for subscriber sessions according to a service (such as a VLAN or a priority), that is, whether the subscriber session is forwarded to an Internet BSG or a voice over IP (VoIP) BSG or an IP television (IPTV) BSG. If multiple BSGs exist for the same service, one of the BSGs may be then selected according to the source address of the subscriber or the loop identifier, for example, if two Internet BSGs exist, one of the BSGs may be selected for a subscriber session according to load conditions of the two Internet BSGs. A simple load balancing policy is setting a load threshold for the BSG, and when the BSG exceeds the load threshold, the BSG needs to report to the load balancing management unit, or when the load of a BSG1 is smaller than the threshold, as long as the subscriber comes online, a BSG selection function unit selects the BSG1 for the subscriber until the load of the BSG1 is larger than the threshold. When the load balancing management unit receives a report of the BSG1, the BSG selection function unit selects a BSG2 for a subsequent online subscriber, and so on.

For the selection of the BNG, the selection unit 52 selects a BNG for the subscriber from the virtual EN according to subscriber information or service information of the subscriber, or selects a physical BNG for the subscriber from the virtual EN according to a load condition of the BNG and according to the load balancing policy, or selects a physical BNG for the subscriber from the virtual EN according to a fault condition of the BNG and according to the disaster recovery backup policy.

If the BNG function is set in the AN, the device management unit 51 performs unified addressing on the access loop identifier in the virtual EN to implement the conversion between the physical access loop identifier and the logic access loop identifier.

Unified addressing on the access loop identifier is taken as an example, and is also applicable to unified addressing on the logic port of the virtual EN as long as an Access-Node-Identifier is changed to a BNG Identifier.

For a DSL/Ethernet (ETH) access system, the format of an access loop identifier is as follows: when the AN supports a DSL line based on an asynchronous transfer mode (ATM), it is Access-Node-Identifier atm slot/port:vpi.vci, or when the AN supports a DSL/ETH line based on the ETH, it is Access-Node-Identifier eth slot/port [:vlan-id].

The Access-Node-Identifier is an identifier of the AN (such as a DSLAM), the slot/port is one or more combinations of a chassis number, a rack number, a frame number, a slot number, a sub-slot number, and a port number on the AN, and the vpi.vci is a virtual path identifier and a virtual channel identifier on the DSL line. "[ ]" in the format represents optional.

For a PON system, the format of an access loop identifier is as follows: when an ONU supports a DSL line based on an ATM, it is Access-Node-Identifier atm slot1/port1/ONUID/slot2/port2:vpi.vci; or when an ONU supports a DSL/ETH line based on the ETH, it is Access-Node-Identifier eth slot1/port1/ONUID/slot2/port2[:vlan-id].

The Access-Node-Identifier is an identifier of an OLT, the slot1/port1 is one or more combinations of a chassis number, a rack number, a frame number, a slot number, a sub-slot number, and a port number on the OLT, and the slot2/port2 is one or more combinations of a chassis number, a rack number, a frame number, a slot number, a sub-slot number, and a port number on the ONU.

The physical access loop identifier refers to an access loop identifier coded according to a physical chassis number, rack number, frame number, slot number, sub-slot number, and port number on an actual AN device, such as the physical access loop identifier corresponding to the left of FIG. 5.

The logic access loop identifier refers to an access loop identifier coded according to a logic chassis number, rack number, frame number, slot number, sub-slot number, and port number on a virtual EN device for presenting a single network element to the operator, and may be set as an Arabic numeral arranged in order or a character string.

Figure 6:
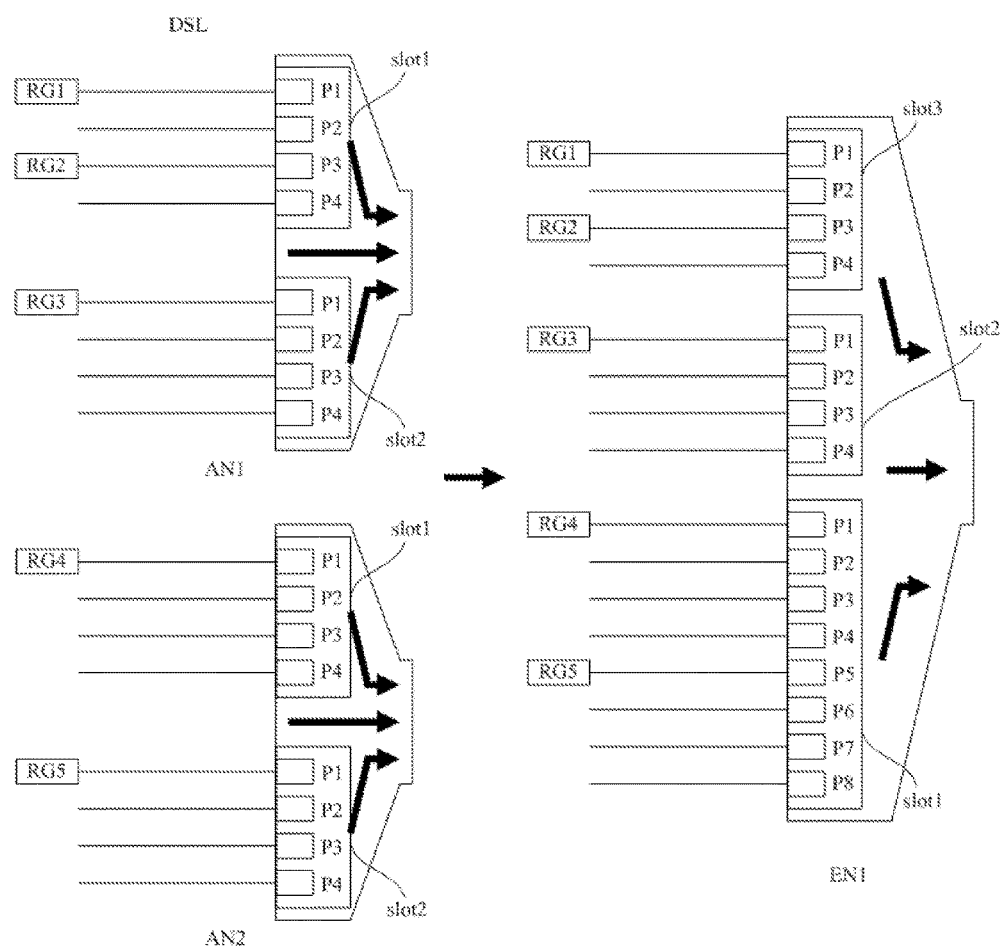
FIG. 6 is a schematic diagram of unified addressing on an access loop identifier in an edge node controller according to an embodiment of the present invention.

FIG. 6 is a schematic diagram of unified addressing on an access loop identifier in an edge node controller according to an embodiment of the present invention, and with reference to a table of unified addressing on access loop identifiers that is shown in Table 1, it can be seen that a one-to-one mapping relationship exists between an access loop identifier of an actual AN device and an access loop identifier of a virtual EN device. Conversion between a physical access loop identifier and a logic access loop identifier is performed according to the mapping relationship in Table 1, and an Access-Node-Identifier is converted into a virtual EN identifier, and a chassis number, a rack number, a frame number, a slot number, a sub-slot number, and a port number of the AN are converted into a chassis number, a rack number, a frame number, a slot number, a sub-slot number, and a port number of the virtual EN.

TABLE 1

| Unified addressing on access loop identifiers | |
|---|---|
| Physical access loop identifier | Logic access loop identifier |
| AN2/slot1/port1 | EN1/slot1/port1 |
| ... | ... |
| AN2/slot1/port4 | EN1/slot1/port4 |
| AN2/slot2/port1 | EN1/slot1/port5 |
| ... | ... |
| AN2/slot2/port4 | EN1/slot1/port8 |
| AN1/slot2/port1 | EN1/slot2/port1 |
| ... | ... |
| AN1/slot2/port4 | EN1/slot2/port4 |
| AN1/slot1/port1 | EN1/slot3/port1 |
| ... | ... |
| AN1/slot1/port4 | EN1/slot3/port4 |

Figure 7:
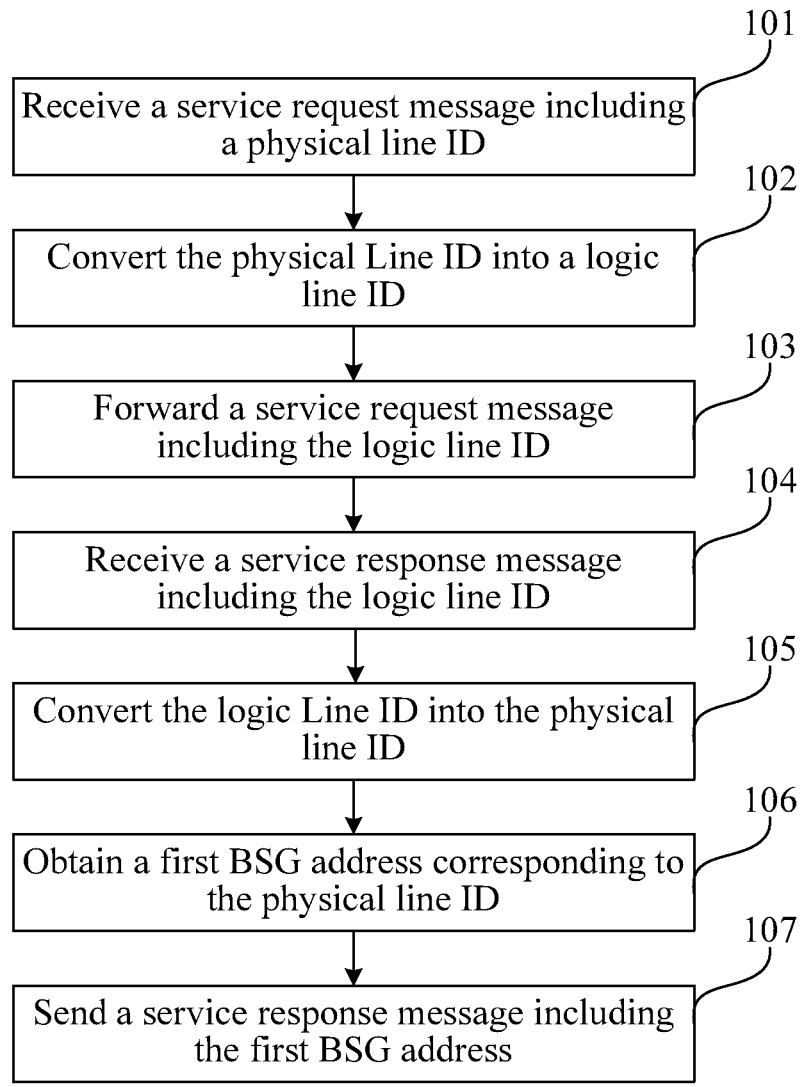
FIG. 7 is a flowchart 1 of a method for allocating an edge node according to an embodiment of the present invention.

FIG. 7 is a flowchart 1 of a method for allocating an edge node according to an embodiment of the present invention, and as shown in the figure, for allocation of an edge node in this embodiment, allocation of a BSG is taken as an example, and for an EN controller, the method for allocating an edge node in the embodiment of the present invention specifically includes the following steps:

Step 101: An EN controller receives a service request message including a physical subscriber identifier and sent by a BNG.

The subscriber identifier may be, but is not limited to, an access loop identifier, and in this embodiment, the subscriber identifier is implemented by using an access loop identifier (line ID), that is, the physical subscriber identifier is implemented by using a physical access loop identifier, and a logic subscriber identifier is implemented by using a logic access loop identifier. For a front-end BNG (here, the BNG and an AN may be a physical entity) of a BSG, a physical line ID is seen, and is carried through the service request message. The service request message may be a subscriber authentication message (Access Request) that needs to be sent to an AAA server, or may be an address allocation discovery message (DHCP Discover) that needs to be sent to a DHCP server, or similarly, may be an address allocation request message (DHCP Request), and all of these service request messages may carry the physical line ID.

Step 102: Convert a physical access loop identifier into a logic access loop identifier (a logic line ID).

For an external server of a virtual EN, devices of various types in the virtual EN need to be considered as a device, so that the physical line ID needs to be converted into the logic line ID.

Step 103: Forward a service request message including the logic access loop identifier.

The EN controller sends the logic line ID to a subsequent server, for example, sends the Access Request to the AAA server, and sends the DHCP Discover or DHCP Request to the DHCP server. In this way, the AAA server and the DHCP server obtain the logic line ID through the service request message to learn that these service request messages are sent by the virtual EN.

Step 104: Receive a service response message including the logic access loop identifier.

When receiving the Access Request sent by the EN controller, the AAA server learns that a subscriber needs to perform a service request, and after the service request succeeds, returns a service response message (such as Access Accept) to the EN controller, and carries the logic line ID in the Access Accept.

Alternatively, when receiving the DHCP Discover, the DHCP server learns that a subscriber needs to perform address allocation, and after an address allocation discovery request succeeds, returns an address allocation service confirmation message (DHCP Offer) to the EN controller, and carries the logic line ID in the DHCP Offer.

Alternatively, when receiving the DHCP Request, after the request succeeds, the DHCP server returns an address allocation service confirmation message (DHCP Ack) to the EN controller, and carries the logic line ID in the DHCP Ack.

Step 105: Convert the logic access loop identifier into the physical access loop identifier.

This step is an inverse conversion process, and for the EN controller, subsequent processing cannot be directly performed on the logic line ID, and it must be converted into the physical line ID, so that this step is a specific conversion process, and the logic line ID obtained from service request return information is converted into the physical line ID.

Step 106: Query a first mapping relationship between the physical access loop identifier and a BSG address according to the physical access loop identifier to obtain a first BSG address corresponding to the physical access loop identifier.

The first mapping relationship may be implemented by using a first mapping table, and a physical line ID and at least one BSG address exist in the first mapping table. Because services may vary, multiple BSG addresses may be required, and at least one first BSG address can be obtained by querying the first mapping table.

Step 107: Send a service response message including the first BSG address to the BNG.

The EN controller needs to forward the service response message received from the AAA server/DHCP server to the BNG, where the message needs to carry a first BSG address corresponding to the subscriber. Because a subscriber may have multiple services, multiple first BSG addresses may exist.

When the subscriber needs to send an IP packet to a first BSG, the IP packet may be sent according to these first BSG addresses.

According to the method for allocating an edge node in the embodiment of the present invention, a core apparatus, an EN controller in a virtual EN is used, and a logic line ID is carried in a service request message; in this way, subsequently, a server considers the virtual EN as a network element. The logic line ID is also carried in a service response message of the service request message, and is converted into a physical line ID. Then, a first BSG corresponding to the physical line ID is obtained by querying a first mapping relationship, and the first BSG is allocated to a subscriber. For an external device, a virtual EN is seen, and the virtual EN controller performs unified control and management on a BSG and a BNG in the virtual EN to avoid a management difficulty caused by distributed deployment of the BSG, and avoid increase of the labor costs and the time costs, and a management difficulty and the costs of an aggregation network and an access network are not increased when a large number of BSGs need to be deployed for a service, thereby reducing the implementation complexity.

Figure 8:
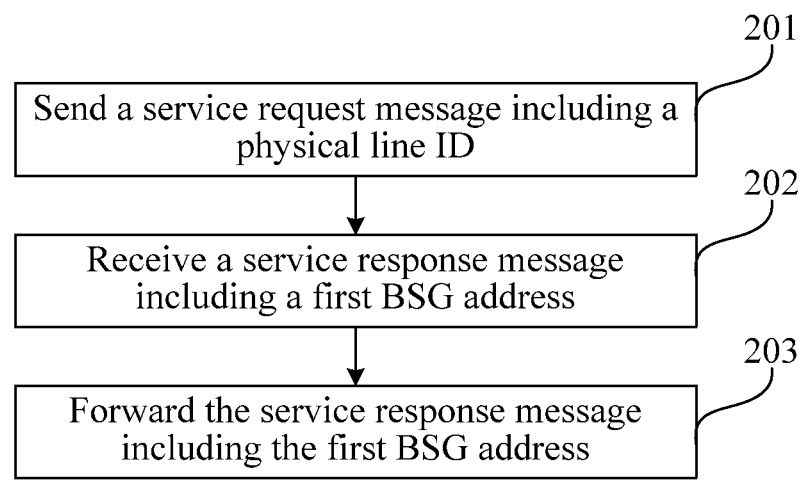
FIG. 8 is a flowchart 2 of a method for allocating an edge node according to an embodiment of the present invention.

The foregoing embodiment is a specific processing process for the EN controller in the virtual EN, and for the BNG at the opposite side, a specific processing method also exists. Here, the BNG and the AN may be a physical integrated apparatus. FIG. 8 is a flowchart 2 of a method for allocating an edge node according to an embodiment of the present invention, and as shown in the figure, for allocation of an edge node in this embodiment, allocation of a BSG is taken as an example, and for a BNG, the method for allocating an edge node in the embodiment of the present invention specifically includes the following steps:

Step 201: Send a service request message including a physical subscriber identifier to an EN controller.

The subscriber identifier may be, but is not limited to, an access loop identifier, and in this embodiment, the subscriber identifier is implemented by using an access loop identifier (line ID), that is, the physical subscriber identifier is implemented by using a physical access loop identifier, and a logic subscriber identifier is implemented by using a logic access loop identifier. The service request message may be sent by a subscriber to the BNG, or may be also triggered by the BNG according to another message sent by a subscriber, for example, the service request message may be an Access Request that needs to be sent to an AAA server, or may be DHCP Discover that needs to be sent to a DHCP server, or similarly, may be a DHCP Request, and all of these service request messages may carry a physical line ID.

Step 202: Receive a service response message including a first BSG address, where the first BSG address is a first BSG address corresponding to a physical access loop identifier in a first mapping relationship.

After the service request message is sent to the AAA server or the DHCP server, the service response message is returned, for example:

When receiving the Access Request sent by the EN controller, the AAA server learns that a subscriber needs to perform a service request, and after the service request succeeds, returns a service response message (such as Access Accept) to the EN controller, and carries a logic line ID in the Access Accept.

Alternatively, when receiving the DHCP Discover, the DHCP server learns that a subscriber needs to perform address allocation, and after an address allocation discovery request succeeds, returns an address allocation service confirmation message (DHCP Offer) to the EN controller, and carries a logic line ID in the DHCP Offer.

Alternatively, when receiving the DHCP Request, after the request succeeds, the DHCP server returns an address allocation service confirmation message (DHCP Ack) to the EN controller, and carries a logic line ID in the DHCP Ack.

The logic line ID obtained from these service response messages is converted into the physical line ID, and at least one first BSG address can be obtained by querying a first mapping table, and the first BSG address is carried in these service response messages.

Step 203: Forward a service response message including the first BSG address to a subscriber.

After receiving the service request message carrying the first BSG address, the subscriber learns a BSG corresponding to the subscriber. Because a subscriber may have multiple services, multiple first BSG addresses may exist.

When the subscriber needs to send an IP packet to a first BSG, the IP packet may be sent according to these first BSG addresses.

According to the method for allocating an edge node in the embodiment of the present invention, a BNG corresponding to a subscriber is used, and a service request message carrying a logic line ID is sent, and subsequently, after converting the logic line ID carried in a returned service response message into a physical line ID, an EN controller queries a first mapping relationship to obtain a first BSG corresponding to the physical line ID, and forwards the first BSG to the subscriber. For an external server, a virtual EN is seen, and unified control and management can be performed on a BSG and a BNG in the virtual EN to avoid a management difficulty caused by distributed deployment of the BSG, and avoid increase of the labor costs and the time costs, and a management difficulty and the costs of an aggregation network and an access network are not increased when a large number of BSGs need to be deployed for a service, thereby reducing the implementation complexity.

Figure 9:
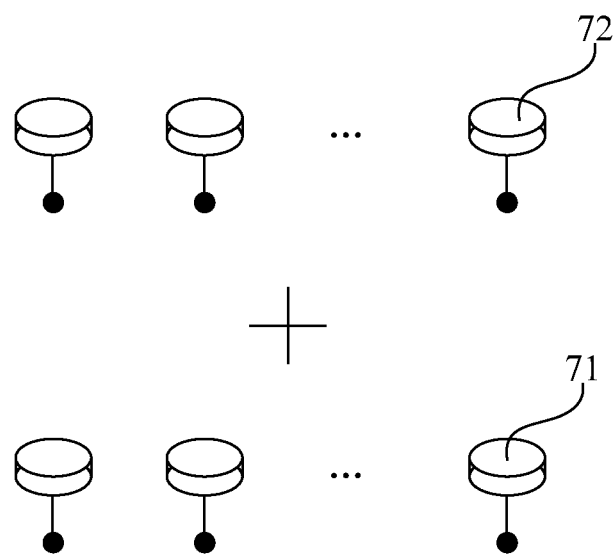
FIG. 9 is a subscriber logic view corresponding to a method for allocating an edge node according to an embodiment of the present invention.
Figure 10A:
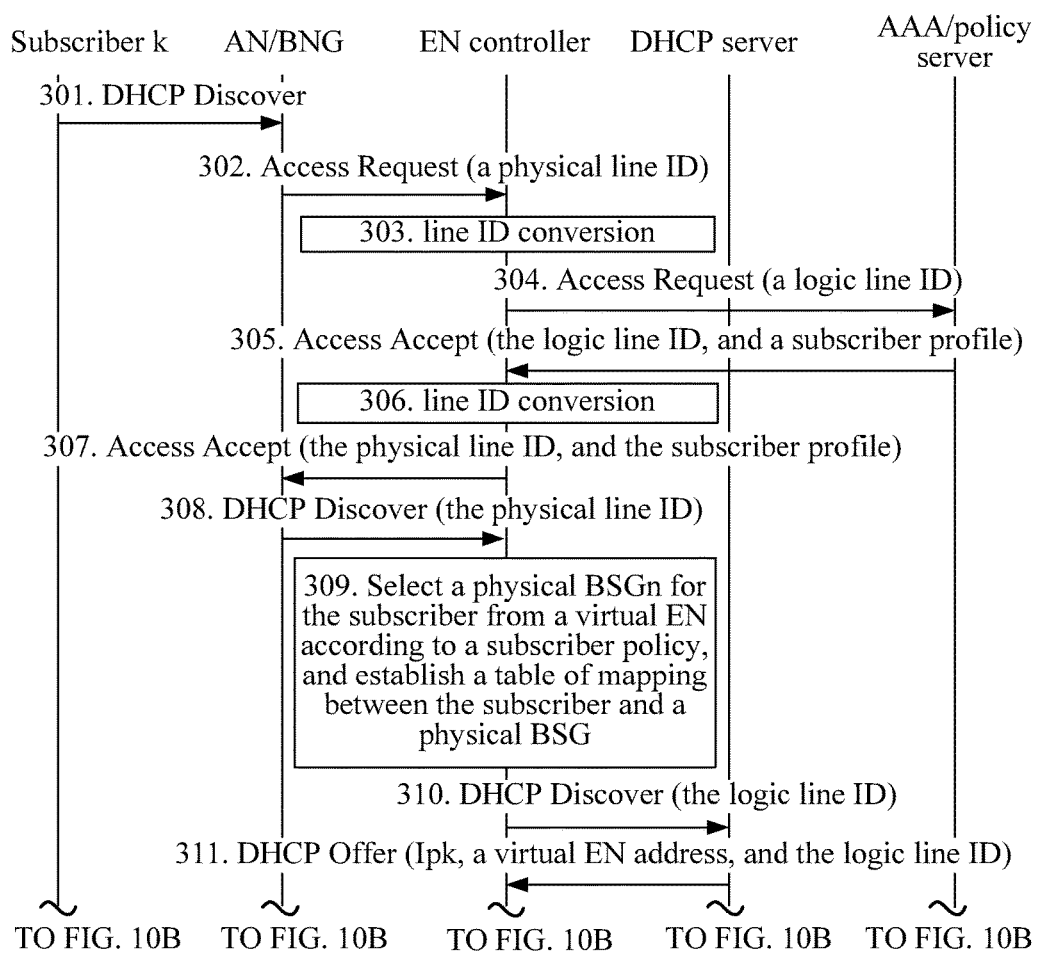
FIG. 10A and FIG. 10B are a signaling diagram 1 of a method for allocating an edge node according to an embodiment of the present invention.
Figure 10B:
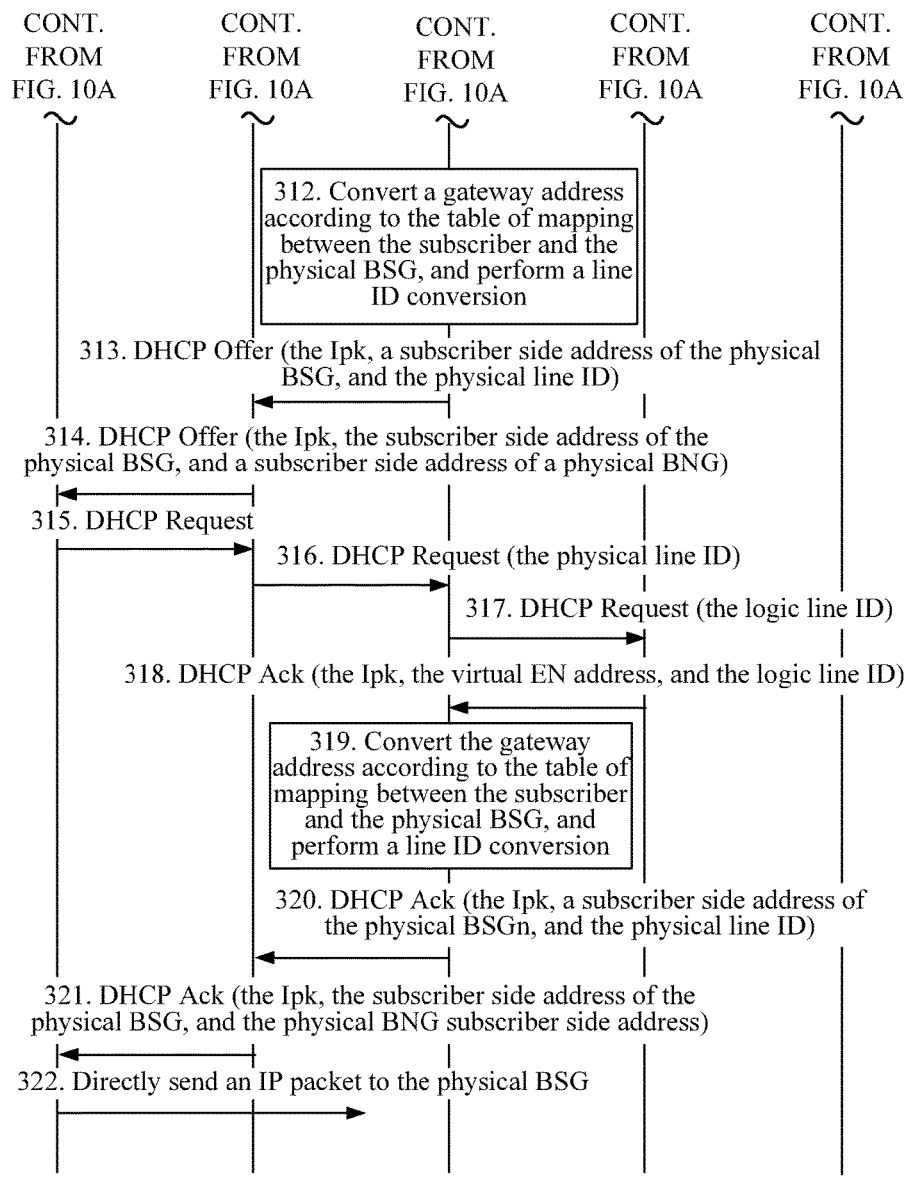

FIG. 9 is a subscriber logic view corresponding to an edge node according to an embodiment of the present invention. For a subscriber, subscriber side addresses of a BNG71 and a BSG72 are seen. FIG. 10A and FIG. 10B are a signaling diagram 1 of a method for allocating an edge node according to an embodiment of the present invention, and as shown in the figure, for allocation of an edge node in this embodiment, allocation of a BSG is taken as an example, and the method for allocating an edge node in the embodiment of the present invention specifically includes the following steps:

Authentication processing is first performed.

Step 301: A subscriber is online, and initiates a broadcast DHCP Discover/Solicit (address allocation discovery) message, and starts a subscriber IP address allocation procedure.

Step 302: A BNG (which may also be an integrated device of a BNG and an AN) receives the DHCP Discover/Solicit message, and the BNG sends an AAA protocol message to a virtual EN controller, and initiates subscriber authentication through the AAA protocol message (such as an Access Request), where the AAA message carries a physical access loop identifier (a physical line ID).

Step 303: The EN controller converts the physical line ID into a logic line ID.

Specifically, the EN controller converts the physical access loop identifier into a logic access loop identifier according to Table 1.

Step 304: The EN controller carries the logic line ID in the AAA protocol message (such as the Access Request) and sends the message to an AAA server, or the EN controller carries the logic line ID and the physical line ID in the AAA message and sends the message to an AAA server, at this time, if the AAA server needs to obtain a physical view, the AAA server may obtain the physical view through the physical access loop identifier.

In this way, the AAA server sees a single view of a virtual EN node, that is, sees the logic access loop identifier.

Step 305: The subscriber authentication succeeds, and the AAA server returns the AAA protocol message (such as Access Accept) to the EN controller, where the AAA message carries a logic access loop identifier and a corresponding subscriber/service profile (or policy), or the AAA message carries a logic access loop identifier, the physical access loop identifier, and a corresponding subscriber/service profile (or policy).

Step 306: The EN controller converts the logic line ID into the physical line ID, and similarly, may perform conversion by using Table 1.

Step 307: The EN controller sends the AAA message to the BNG, where the physical access loop identifier is carried (the logic access loop identifier may be also carried at the same time), or a virtual EN controller removes the logic access loop identifier from the AAA message, and only reserves the physical access loop identifier, and sends it to the BNG.

In addition, the EN controller may download a subscriber/service profile (or policy) for the BSG, so that the BSG performs distribution according to the subscriber/service profile (or policy).

Therefore, the authentication ends, and the following steps are a process of how to send a BSG address.

It should be noted that, in step 302, the AAA message may carry a subscriber name and a password instead of the physical access loop identifier; therefore, in step 303 and step 304, the AAA message forwarded to the AAA server also carries the subscriber name and the password. In step 305, the AAA message may not carry the logic access loop identifier.

Step 308: After the subscriber authentication succeeds, the BNG relays the received DHCP Discover/Solicit message to the EN controller, where the DHCP message carries the physical access loop identifier.

Step 309: The EN controller performs DHCP listening and selects a first BSG for the subscriber from a BSG belonging to an EN.

For the selection of the first BSG, at least one BSG may be selected for the subscriber from a virtual EN according to a subscriber or service policy, or at least one physical BSG is selected for the subscriber from a BSG of a virtual EN according to a load condition of the BSG and according to a load balancing policy, or at least one physical BSG is selected for the subscriber from a virtual EN according to a fault condition of the BSG and according to a disaster recovery backup policy, and a table of mapping between the subscriber and the physical BSG is refreshed.

Table 2 is a table of mapping between a subscriber and a physical BSG in the EN controller, for example, a subscriber corresponding to a Line ID 1 subscribes to an Internet service and a video service, so that the EN controller allocates subscriber side addresses of BSGs of the two different services.

TABLE 2

Table of mapping between a subscriber and a physical BSG in the EN controller

| Physical access loop identifier | Subscriber side address of an Internet BSG | Subscriber side address of a VOIP BSG | Subscriber side address of a CDN BSG |
|---|---|---|---|
| Line ID 1 | 10.70.40.91 | 10.70.80.01 | — |
| Line ID 2 | 10.70.40.91 | — | 10.60.36.11 |
| Line ID 3 | 10.70.40.92 | 10.70.80.01 | 10.60.36.11 |

Step 310: The controller converts the physical access loop identifier into the logic access loop identifier according to Table 1, carries the logic access loop identifier in the DHCP message, and then sends the message to the DHCP server.

Alternatively, the virtual EN controller initiates a DHCP relay message (such as a Relay forward message), uses the original DHCP Discover/Solicit message as an option (option), adds, according to Table 1, the logic access loop identifier corresponding to the physical access loop identifier into the DHCP relay message as an option (option), and then, sends the message to the DHCP server.

Therefore, the DHCP server sees a single view of an EN node, that is, sees the logic access loop identifier. The advantage of the latter method is that, when the DHCP server needs to see a physical view, the DHCP server may see the physical view through the physical access loop identifier.

Step 311: The DHCP server replies to a DHCP Offer/Advertise (address allocation service confirmation) message, where the DHCP message carries the logic access loop identifier and a virtual EN address (optionally, such as a virtual BSG address), and directly sends the DHCP Offer/Advertise message to the subscriber.

Alternatively, the DHCP server replies to a DHCP Offer/Advertise message, and carries the physical access loop identifier and a virtual EN address (such as a virtual BSG address), and then sends the DHCP Offer/Advertise message to the subscriber through the DHCP relay message (such as a Relay reply message), where the DHCP relay message carries the logic access loop identifier.

A gateway address is carried by extending an option of the DHCP message. For example, three options are extended in the DHCP message, an Internet service gateway option carries an Internet service gateway address, a VOIP service gateway option carries a VOIP service gateway address, and a video service gateway option carries a video service gateway address, and here, these three options are filled in according to the virtual EN address.

Alternatively, four options of the DHCP message are extended, a gateway option carries the virtual EN address, an Internet service gateway option carries an Internet service gateway address, a VOIP service gateway option carries a VOIP service gateway address, and a video service gateway option carries a video service gateway address. In step 311, the virtual EN address is first carried, and the latter three options are added by the virtual EN controller. The latter method is mainly applicable to a scenario where an option is not allowed to be changed.

Step 312: The virtual EN controller extracts the DHCP offer/Advertise message from the DHCP relay message, then, queries Table 2 directly according to the physical access loop identifier or according to the physical access loop identifier after converting the logic access loop identifier into the physical access loop identifier to obtain each service gateway (that is, BSG) address corresponding to the physical access loop identifier.

Step 313: The virtual EN controller changes a service gateway option in the DHCP message, for example, changes three extended options of the DHCP message, that is, changes an Internet service gateway option to carry a subscriber side address of an Internet BSG, changes a VOIP service gateway option to carry a subscriber side address of a VOIP BSG, and changes a video service gateway option to carry a subscriber side address of a CDN BSG.

Alternatively, the virtual EN controller adds a gateway option, for example, adds the three extended options of the DHCP message: an Internet service gateway option carries a subscriber side address of an Internet BSG, a VOIP service gateway option carries a subscriber side address of a VOIP BSG, and a video service gateway option carries a subscriber side address of a CDN BSG. The latter method is mainly applicable to a scenario where an option is not allowed to be changed, and optionally, the virtual EN controller removes an option for carrying the virtual EN address.

Step 314: Optionally, the BNG adds the subscriber side address of the BNG for the DHCP message, and then relays the DHCP Offer/Advertise message to the subscriber.

Step 315: The subscriber sends a broadcast DHCP Request (an address allocation request) message to the BNG.

Step 316: The BNG forwards the DHCP Request message to the EN controller, and initiates the broadcast.

Step 317: The EN controller converts the physical access loop identifier into the logic access loop identifier according to Table 1, and then carries the logic access loop identifier in the DHCP message and sends the message to the DHCP server; or the virtual EN controller initiates the DHCP relay message (such as a Relay forward message), uses the original DHCP Request message as an option and uses the logic access loop identifier corresponding to the physical access loop identifier as an option according to Table 1, adds them into the DHCP relay message, and then sends the message to the DHCP server.

Step 318: The DHCP server replies to the DHCP Ack/Reply (address allocation service confirmation) message, where the DHCP message carries the logic access loop identifier and the virtual EN address (such as the virtual BSG address), and directly sends the DHCP Ack/Reply message to the subscriber. Alternatively, the DHCP server replies to the DHCP Ack/Reply message, where the DHCP message carries the physical access loop identifier and the virtual EN address (such as the virtual BSG address), and then sends the DHCP Ack/Reply message to the subscriber through the DHCP relay message (such as the Relayreply message), where the DHCP relay message carries the logic access loop identifier.

A gateway address is carried by extending an option of the DHCP message. For example, three options are extended in the DHCP message; an Internet service gateway option carries an Internet service gateway address, a VOIP service gateway option carries a VOIP service gateway address, and a video service gateway option carries a video service gateway address, and here, these three options are filled in according to the virtual EN address. Alternatively, four options of the DHCP message are extended; a gateway option carries the virtual EN address, an Internet service gateway option carries an Internet service gateway address, a VOIP service gateway option carries a VOIP service gateway address, and a video service gateway option carries a video service gateway address. In step 311, the virtual EN address is first carried, and the latter three options are added by the virtual EN controller. The latter method is mainly applicable to the scenario where the option is not allowed to be changed.

Step 319: The virtual EN controller queries Table 2 directly according to the physical access loop identifier or according to the physical access loop identifier after converting the logic access loop identifier into the physical access loop identifier to obtain each service gateway (that is, BSG) address corresponding to the physical access loop identifier.

Step 320: The virtual EN controller changes the service gateway option in the DHCP message, for example, changes the three extended options of the DHCP message, that is, changes the Internet service gateway option to carry the subscriber side address of the Internet BSG, changes the VOIP service gateway option to carry the subscriber side address of the VOIP BSG, and changes the video service gateway option to carry the subscriber side address of the CDN BSG.

Alternatively, the virtual EN controller adds the gateway option, for example, adds the three extended options of the DHCP message: the Internet service gateway option carries the subscriber side address of the Internet BSG, the VOIP service gateway option carries the subscriber side address of the VOIP BSG, and the video service gateway option carries the subscriber side address of the CDN BSG. The latter method is mainly applicable to the scenario where an option is not allowed to be changed, and optionally, the virtual EN controller removes an option for carrying the virtual EN address.

Step 321: Optionally, the BNG adds the subscriber side address of the BNG for the DHCP message, and then relays the DHCP Ack/Reply message to the subscriber.

Step 322: A destination address of the IP packet sent by the subscriber is the service gateway address carried in the DHCP message, and the IP packet is directly forwarded by the BNG to a corresponding BSG.

It should be noted that, in step 313 and step 320, the EN controller sends the physical BSG address to the BNG respectively through the DHCP Offer message and the DHCP Ack message; however, under normal circumstances, the BSG address carried in the DHCP Ack message is required because the message is a confirmation message, and the BNG can confirm the BSG address after receiving the message. Optionally, definitely, the BSG address may be not carried in the DHCP Offer message. Another optional method is that, the BSG address is carried in the DHCP Offer message, and the BSG address is not carried in the DHCP Ack message, which is only a confirmation, so that the BSG address in the DHCP Offer message is confirmed to be an allocated BSG address.

In this embodiment, the subscriber can see subscriber side addresses of the BNG and the BSG. In this embodiment, the BSG address corresponding to the subscriber (access loop identifier) is delivered to the BNG and the subscriber by using a DHCP process, or may be delivered to the BNG and/or BSG through another policy control protocol (such as an Openflow protocol), and the virtual EN controller is used as an AAA proxy in the AAA process. Because in the DHCP process, the virtual EN controller dynamically plays a role for selecting the BSG according to a subscriber online requirement, the labor costs of statically configuring a mapping relationship between the subscriber and the BSG on the BNG is removed. Another method is that the EN controller is used as an authenticator, and the DHCP Discover message is first uploaded to the EN controller, and then, the AAA authentication process is triggered; at this time, the physical access loop identifier carried in the DHCP message needs to be converted into the logic loop identifier for being used in the AAA authentication process.

In this embodiment, the DHCP server and the AAA server receive the message delivered by the EN controller, view the EN (BSG and BNG) as one network element device, and do not perceive a specific BSG, so that a management difficulty and the management costs are not increased for a device of the server, thereby reducing the implementation complexity and implementing unified management on the BSG under the EN. The address of the BSG is delivered to the BNG through the DHCP message (DHCP Offer and DHCP Ack), and then, the BNG sends the subscriber side addresses of the BSG and the BNG to the subscriber; therefore, the subscriber can perceive the subscriber side addresses of the BSG and the BNG, and when the subscriber needs to send the IP packet to the BSG, the address of the BSG needs to be carried.

Figure 11A:
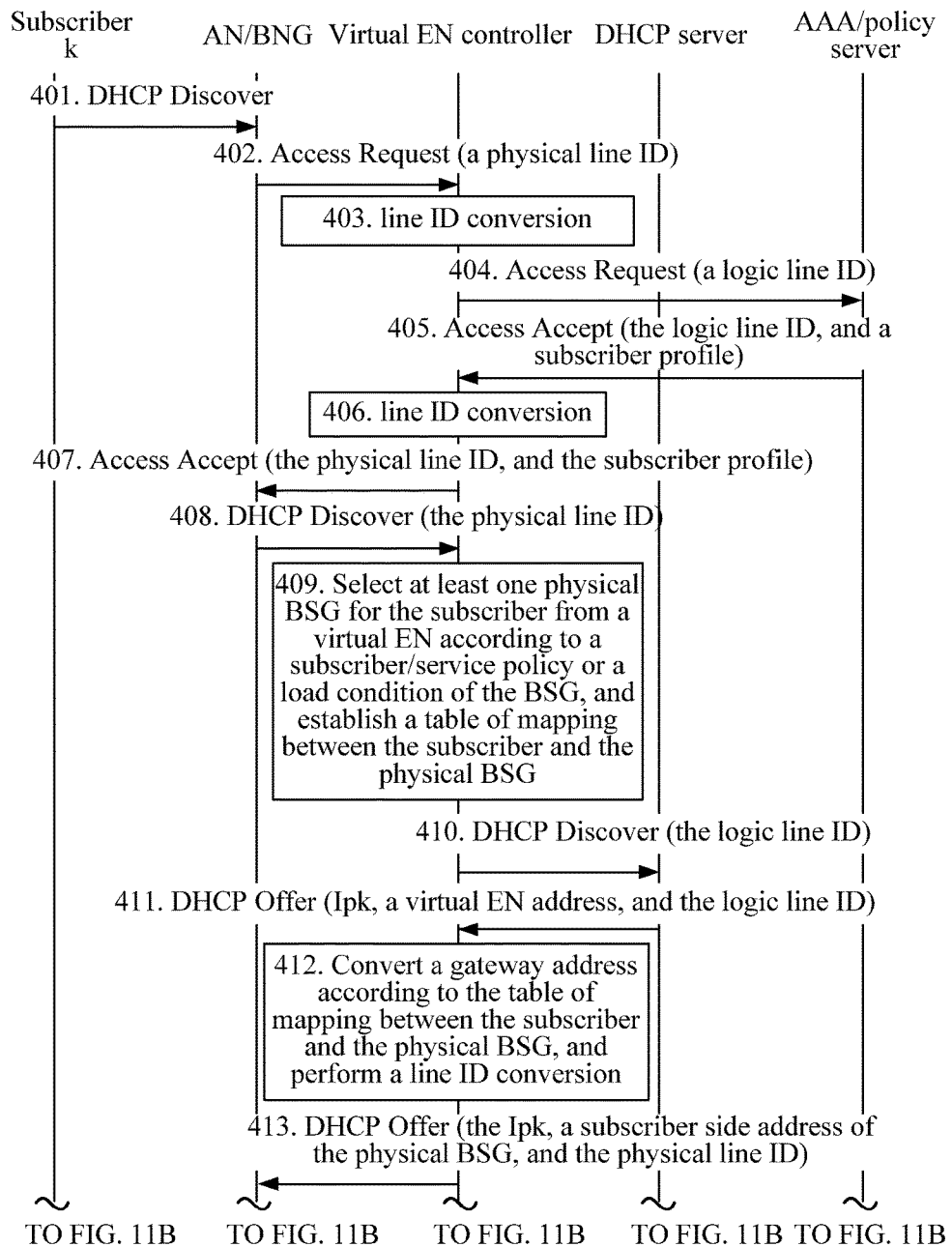
FIG. 11A and FIG. 11B are a signaling diagram 2 of a method for allocating an edge node according to an embodiment of the present invention.
Figure 11B:
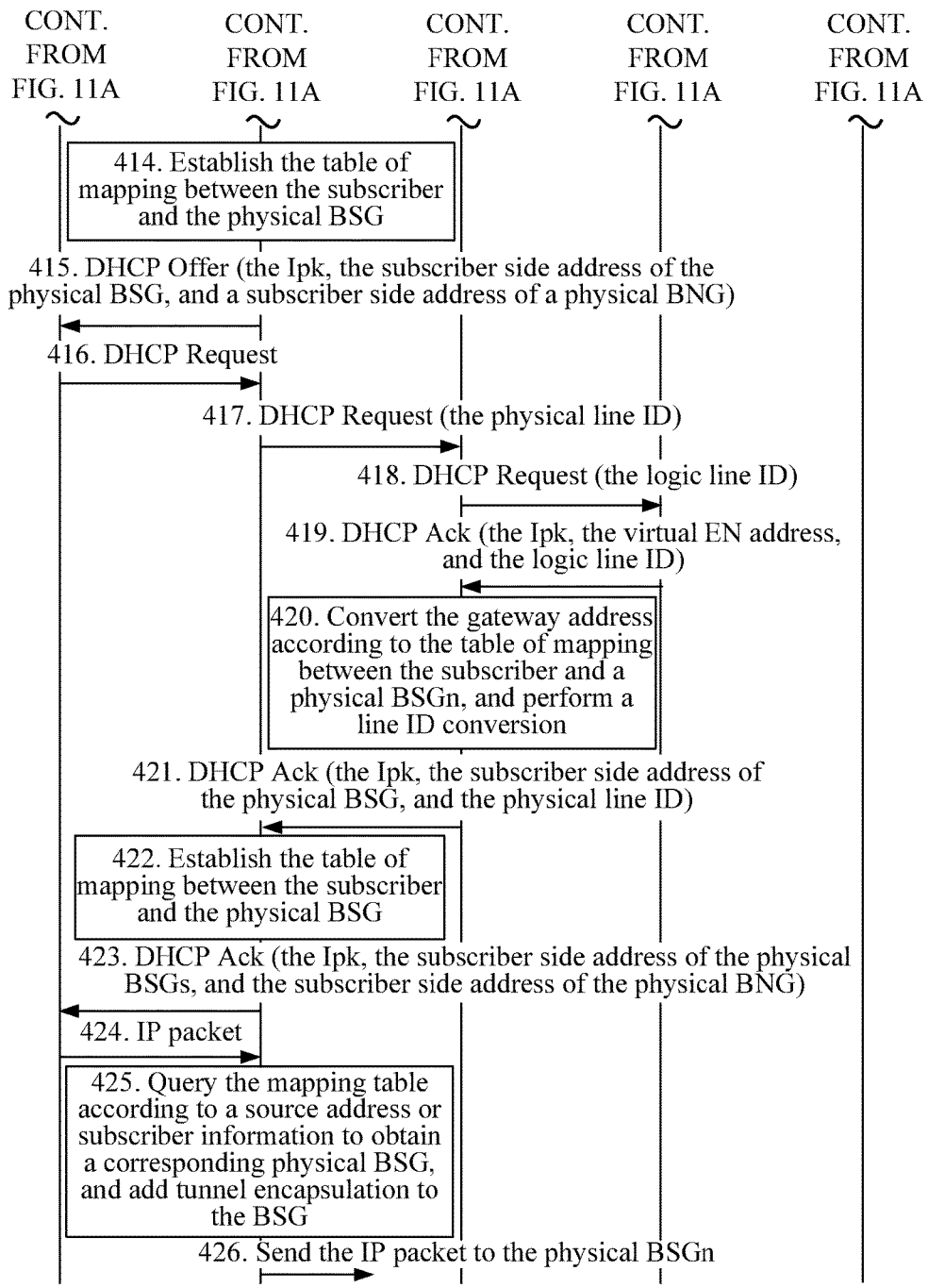

FIG. 11A and FIG. 11B are a signaling diagram 2 of a method for allocating an edge node according to an embodiment of the present invention, and as shown in the figure, with reference to FIG. 9, for allocation of an edge node in this embodiment, allocation of a BSG is taken as an example, and the method for allocating an edge node in the embodiment of the present invention specifically includes the following steps:

Step 401 to step 413 are completely the same as step 301 and step 313 in the foregoing embodiment, which are not described herein again.

Step 414: Establish a table of mapping between the subscriber and the BSG, as shown in Table 3, according to the extended service gateway option of the DHCP message, except a subscriber IP address, other items can be learned so far, and here, different services are differentiated through different VLANs, or services may be differentiated in another manner, for example, through an Ethernet priority (Ethernet Priority) or an MPLS label.

TABLE 3

Table of mapping between a subscriber and a physical BSG

| Physical access loop identifier | Subscriber IP address | Subscriber MAC address | VLAN | Subscriber side address of a BSG |
|---|---|---|---|---|
| Line ID 1 | IPk | MACk | t (VOIP) | Subscriber side address of a VOIP BSG: 10.70.80.01 |
| | | | t + 1 (video) | Subscriber side address of a CDN BSG: 10.60.36.11 |
| Line ID 2 | IPj | MACj | t + 1 (video) | Subscriber side address of a CDN BSG: 10.60.36.11 |

TABLE 3-continued

Table of mapping between a subscriber and a physical BSG

| Physical access loop identifier | Subscriber IP address | Subscriber MAC address | VLAN | Subscriber side address of a BSG |
|---|---|---|---|---|
| | | | t + 2 (Internet) | Subscriber side address of an Internet BSG: 10.70.40.91 |
| Line ID 3 | IPi | MACi | t (VOIP) | Subscriber side address of a VOIP BSG: 10.70.80.01 |
| | | | t + 1 (video) | Subscriber side address of a CDN BSG: 10.60.36.11 |
| | | | t + 2 (Internet) | Subscriber side address of an Internet BSG: 10.70.40.92 |

Step 415 to step 421 are completely the same as step 314 to step 320 in the foregoing embodiment, which are not described herein again.

Step 422: This step has two implementation manners, one is that, if Table 3 is established in step 414, however, no subscriber address exists in Table 3 established in step 414, and DHCP listening is performed in step 421, the subscriber address is obtained; therefore, the subscriber address only needs to be added into Table 3 in this step.

The other implementation manner is that, if Table 3 is not established in step 414, Table 3 may be established in this step because information required for establishing Table 3 is obtained in this step.

Step 423: Optionally, the BNG adds the subscriber side address of the BNG for the DHCP message, and then relays the DHCP Ack/Reply message to the subscriber.

Step 424: The subscriber sends an IP packet.

Step 425: Query the mapping Table 3 according to a source address or subscriber information (such as a subscriber MAC address MACk or a subscriber IP address IPk) or other subscriber information (such as a line ID/subscriber VLAN) to obtain a corresponding physical BSG, and add tunnel encapsulation to the BSG.

Step 426: Forward the IP packet of the subscriber to the corresponding BSG through the BNG.

In this embodiment, Table 3 is established through the BNG in step 414 and/or step 422, and it may be established by the EN controller in another manner, and two establishment manners thereof exist.

In a first manner, Table 3 is established by the EN controller in step 412, and similarly, no subscriber address exists in Table 3, and a subscriber address needs to be filled in Table 3 in step 420, so that Table 3 is complete, and then is sent, through an AAA (such as a Diameter protocol) message, to the BNG or a node connected to multiple BSGs. In another manner, Table 3 is directly established by the EN controller in step 420, and then, is sent, through an AAA (such as a Diameter protocol) message, to the BNG or a node connected to multiple BSGs.

Therefore, the BNG does not need to establish a table of mapping between the subscriber and the physical BSG in step 414 and/or step 422, thereby simplifying the implementation complexity of the BNG.

Two differences exist between this embodiment and the foregoing embodiment: the first one is that, the BNG in this embodiment needs to maintain Table 3, while Table 3 does not exist in the foregoing embodiment; and the second is that, because of the existence of Table 3, the BSG address does not need to be carried when the subscriber sends the IP packet to the BSG, and the BSG address is obtained by querying Table 3 according to the subscriber address by BNG.

In this embodiment, the DHCP offer/Advertise message may not carry the BSG address; however, an HCP Ack/Reply message must carry the BSG address. In the DHCP process, the virtual EN controller plays a role for selecting the BSG according to a subscriber online requirement, and can dynamically enable the BNG to learn the mapping relationship between the subscriber and the BSG; therefore, distribution selection and calculation may be not performed on each packet in a subsequent process of a subscriber session, and the packet is directly forwarded according to the mapping relationship between the subscriber and the BSG, thereby reducing the implementation complexity of the BNG, and removing the labor costs of statically configuring the mapping relationship between the subscriber and the BSG on the BNG.

In this embodiment, the DHCP server and the AAA server receive the message delivered by the EN controller, view the EN (BSG and BNG) as a network element device, and do not perceive a specific BSG, so that a management difficulty and the management costs are not increased for a device of the server, thereby reducing the implementation complexity and implementing unified management on the BSG under the EN. The address of the BSG is delivered to the BNG through the DHCP message (DHCP Offer and DHCP Ack), and then, the BNG sends the subscriber side addresses of the BSG and the BNG to the subscriber; therefore, the subscriber can perceive the subscriber side addresses of the BSG and the BNG, and when the subscriber needs to send the IP packet to the BSG, the packet can be sent to the BSG by using Table 3 maintained by the BNG.

Figure 12A:
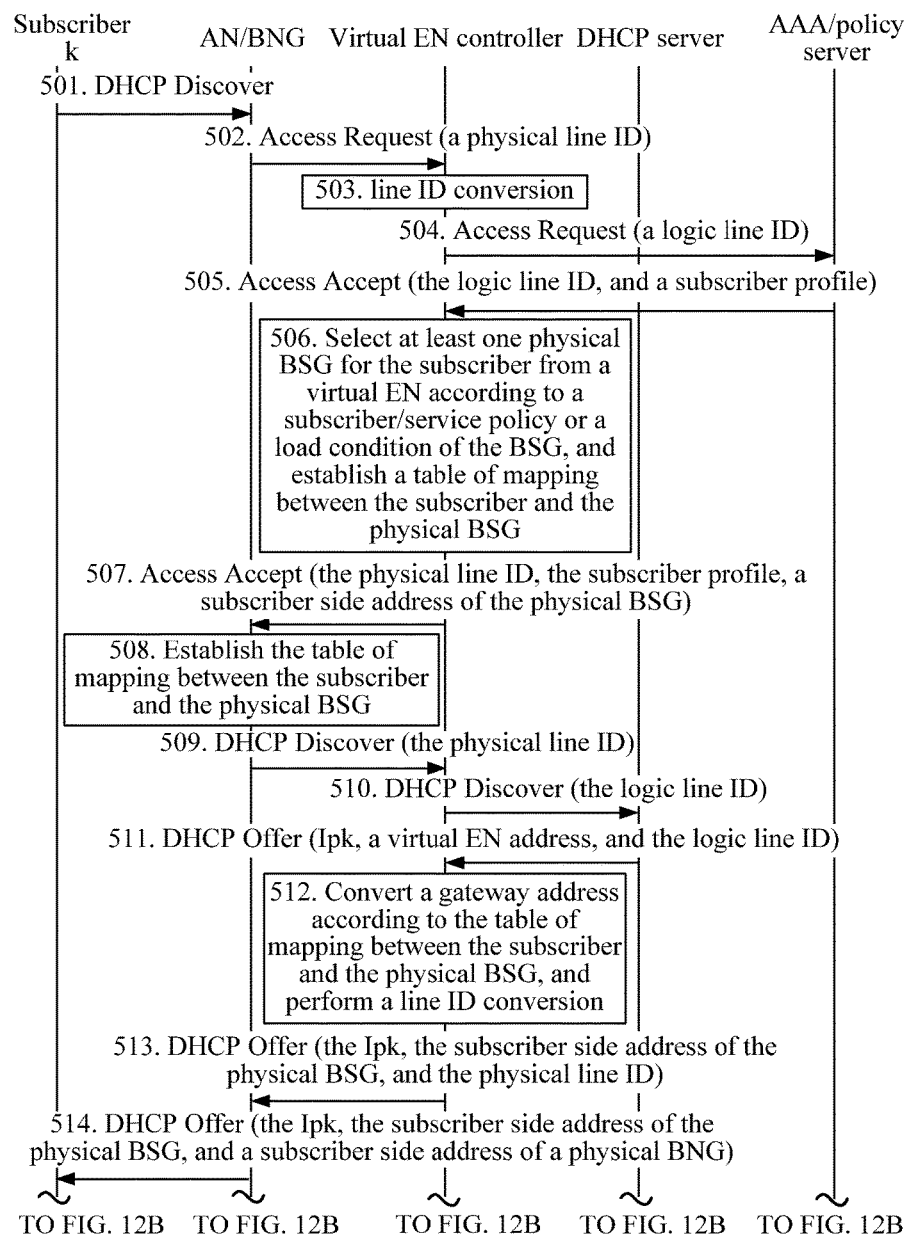
FIG. 12A and FIG. 12B are a signaling diagram 3 of a method for allocating an edge node according to an embodiment of the present invention.
Figure 12B:
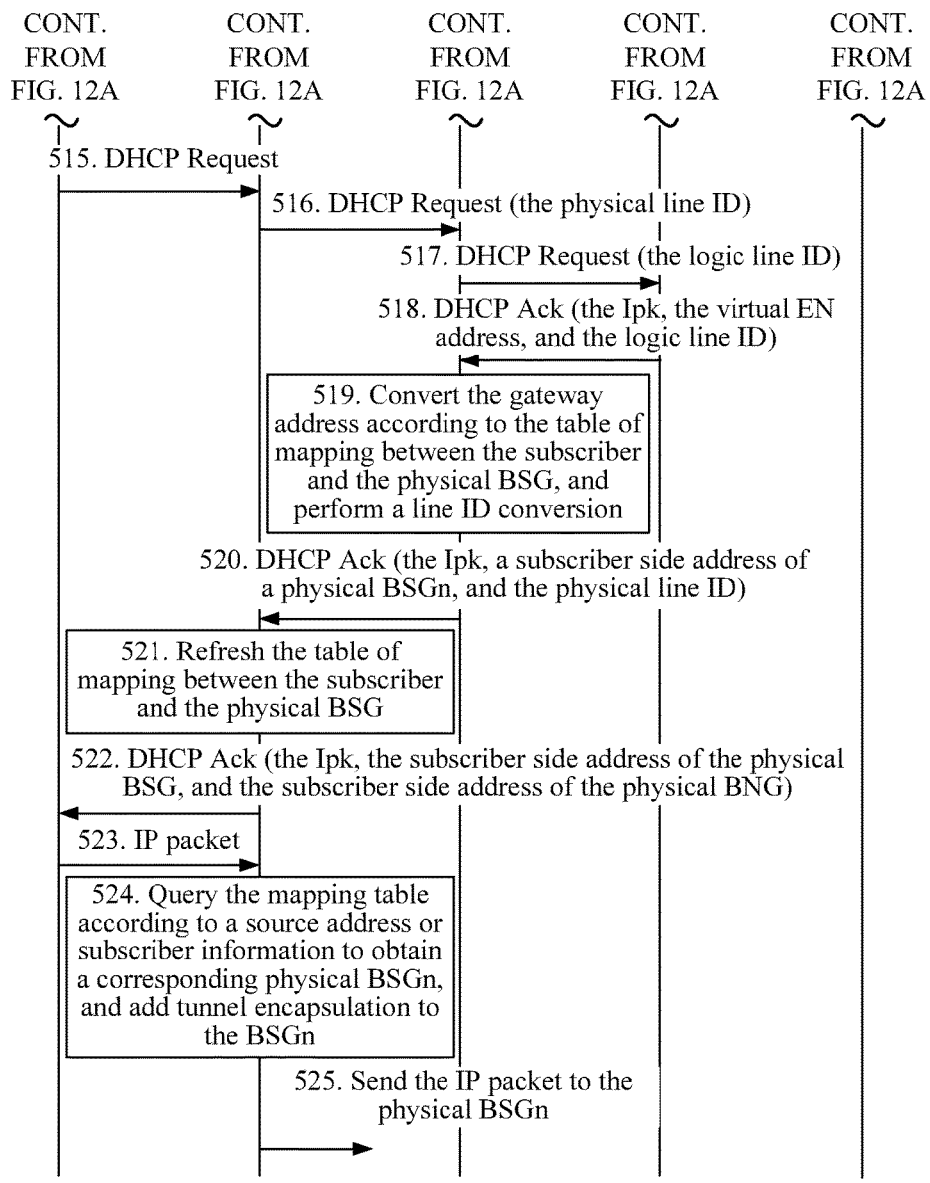

FIG. 12A and FIG. 12B are a signaling diagram 3 of a method for allocating an edge node according to an embodiment of the present invention, and as shown in the figure, with reference to FIG. 9, for allocation of an edge node in this embodiment, allocation of a BSG is taken as an example, and the method for allocating an edge node in the embodiment of the present invention specifically includes the following steps:

Step 501 to step 505 are completely the same as step 301 to step 305 in the foregoing embodiments or step 401 to step 405 in the foregoing embodiments, which are not described herein again.

Step 506: The EN controller performs DHCP listening and selects a first BSG for the subscriber from a BSG to which an EN belongs.

For the selection of the first BSG, at least one BSG may be selected for the subscriber from a virtual EN according to a subscriber or service policy, or at least one physical BSG is selected for the subscriber from a BSG of a virtual EN according to a load condition of the BSG and according to a load balancing policy, or at least one physical BSG is selected for the subscriber from a virtual EN according to a fault condition of the BSG and according to a disaster recovery backup policy, and a table of mapping between the subscriber and the physical BSG is refreshed.

Step 507: The EN controller performs conversion of the access loop identifier according to Table 1, and then adds and carries the physical access loop identifier and a BSG address corresponding to the physical access loop identifier in the AAA message, and sends the message to the BNG. The virtual EN controller may further download a subscriber/service profile (or policy) for the BSG, so that the BSG performs distribution according to the subscriber/service profile (or policy), or the AAA message carries a subscriber name and a password and is sent to the AAA server.

A gateway address is carried by extending an attribute of the AAA message. For example, three attributes are extended in the AAA message: an Internet service gateway attribute carries a subscriber side address of an Internet BSG, a VOIP service gateway attribute carries a subscriber side address of a VOIP BSG, and a video service gateway attribute carries a subscriber side address of a CDN BSG.

Step 508: Establish a table of mapping between the subscriber and the BSG, for example, Table 3, according to an extended service gateway attribute of the AAA message; except a subscriber IP address, other items can be learned so far, and similarly, different services are differentiated through different VLANs, or services may be differentiated in another manner, for example, through an Ethernet priority (Ethernet Priority) or an MPLS label.

Step 509: After the subscriber authentication succeeds, the BNG relays the received DHCP Discover/Solicit message to the EN controller, where the DHCP message carries the physical access loop identifier.

Step 510 to step 513 are completely the same as step 410 to step 413 in the foregoing embodiments.

Step 514 to step 520 are completely the same as step 415 to step 421 in the foregoing embodiments.

Step 521 to step 525 are completely the same as step 422 to step 426 in the foregoing embodiments.

Similarly, it should be noted that, in step 513 and step 520, the EN controller sends the physical BSG address to the BNG through the DHCP Offer message and the DHCP Ack message; however, under normal circumstances, the BSG address carried in the DHCP Ack message is required because the message is a confirmation message, and the BNG can confirm the BSG address after receiving the message. Optionally, definitely, the BSG address may be not carried in the DHCP Offer message. Another optional method is that, the BSG address is carried in the DHCP Offer message, and the BSG address is not carried in the DHCP Ack message, which is only a confirmation, so that the BSG address in the DHCP Offer message is confirmed to be an allocated BSG address.

In addition, step 521 also has two implementation manners, one is that, if Table 3 is established in step 508, however, no subscriber address exists in Table 3 established in step 508, and subscriber listening is performed in step 521, the subscriber address is obtained; therefore, the subscriber address only needs to be added into Table 3 in this step.

The other implementation manner is that, if Table 3 is not established in step 508, Table 3 may be established in this step because information required for establishing Table 3 is obtained in this step.

In this embodiment, Table 3 is established through the BNG in step 508 and/or step 521, and it may be established by the EN controller in another manner, and two establishment manners thereof exist.

In first manner, Table 3 is established by the EN controller in step 506, and similarly, no subscriber address exists in Table 3, and a subscriber address needs to be filled in Table 3 in step 519, so that Table 3 is complete, and then is sent, through an AAA (such as a Diameter protocol) message, to the BNG or a node connected to multiple BSGs. In another manner, Table 3 is directly established by the EN controller in step 519, and then is sent, through an AAA (such as a Diameter protocol) message, to the BNG or a node connected to multiple BSGs.

In this embodiment, in the AAA authentication process, the virtual EN controller plays a role for selecting the BSG according to a subscriber online requirement, and can dynamically enable the BNG to learn the mapping relationship between the subscriber and the BSG; therefore, distribution selection and calculation may be not performed on each packet in a subsequent process of a subscriber session, and the packet is directly forwarded according to the mapping relationship between the subscriber and the BSG, thereby reducing the implementation complexity of the BNG, and removing the labor costs of statically configuring the mapping relationship between the subscriber and the BSG on the BNG.

In this embodiment, the DHCP server and the AAA server receive the message delivered by the EN controller, view the EN (BSG and BNG) as a network element device, and do not perceive a specific BSG, so that a management difficulty and the management costs are not increased for a device of the server, thereby implementing unified management on the BSG under the EN. A main difference between this embodiment and the foregoing embodiments lies in that, in this embodiment, the EN controller delivers the subscriber side address of the physical BSG to the BNG through the AAA message (Access Accept), then, the BNG sends the subscriber side addresses of the BSG and BNG to the subscriber; therefore, the subscriber can perceive the subscriber side addresses of the BSG and the BNG, and when the subscriber needs to send the IP packet to the BSG, the packet can be sent to the BSG by using Table 3 maintained by the BNG.

The foregoing three embodiments are the process of allocating and delivering a BSG, and definitely, during work, the BSG may be changed, and the following is a changing procedure of the BSG.

Figure 13:
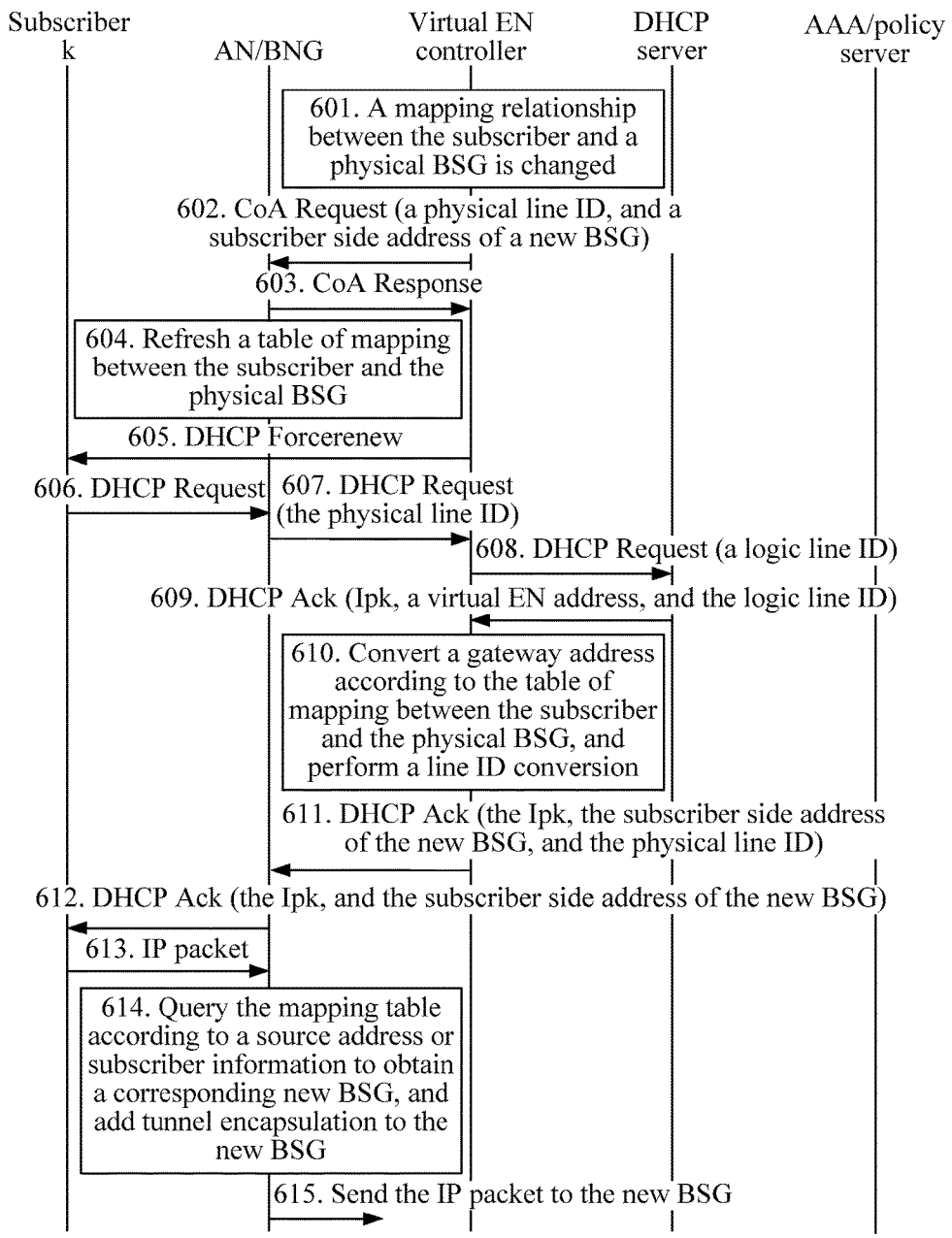
FIG. 13 is a signaling diagram 1 of a changing process of an edge node in a method for allocating an edge node according to an embodiment of the present invention.

FIG. 13 is a signaling diagram 1 of a changing process of BSG in a method for allocating an edge node according to an embodiment of the present invention, and as shown in the figure, with reference to FIG. 9, the changing process of a BSG in the embodiment of the present invention specifically includes the following steps:

Step 601: A mapping relationship between a subscriber and a physical BSG is changed, for example, because of disaster recovery backup or green energy-saving requirements, the subscriber is required to be migrated to another BSG, or during load balancing, the physical BSG is changed.

Step 602: A virtual EN controller sends an AAA message, such as a Change of Authorization (CoA) Request message, which carries a physical access loop identifier and a subscriber side address of a new BSG that corresponds to the physical access loop identifier.

Step 603: A BNG replies to the AAA message such as a Change of Authorization (CoA) Response message.

Step 604: The BNG refreshes a subscriber side address of a BSG in a table of mapping between the subscriber and the BSG, such as Table 3, according to an extended service gateway attribute of the AAA message.

Step 605: The virtual EN controller directly initiates a DHCP Force renew message to the subscriber, where the force renew message is delivered by the virtual EN controller to the subscriber, and the virtual EN controller notifies, by sending the force renew message to the subscriber, the subscriber that a BSG address corresponding to the subscriber is changed.

The process of step 606 to step 611 is completely the same as that of step 515 to step 520 in the foregoing third embodiment of the method for allocating a BNG.

The process of step 612 to step 615 is completely the same as that of step 522 to step 525 in the foregoing third embodiment of the method for allocating a BNG.

As described in the foregoing third embodiment of the method for allocating a BNG, if Table 3 is generated by the EN controller, when the mapping relationship between the subscriber and the physical BSG is changed, the virtual EN controller directly updates or refreshes the table of mapping between the subscriber and the physical BSG according to Table 3, and then, the controller delivers, through the AAA (such as a Diameter protocol) message, Table 3 to the BNG or a node connected to multiple BSGs, and then initiates step 605.

Figure 14:
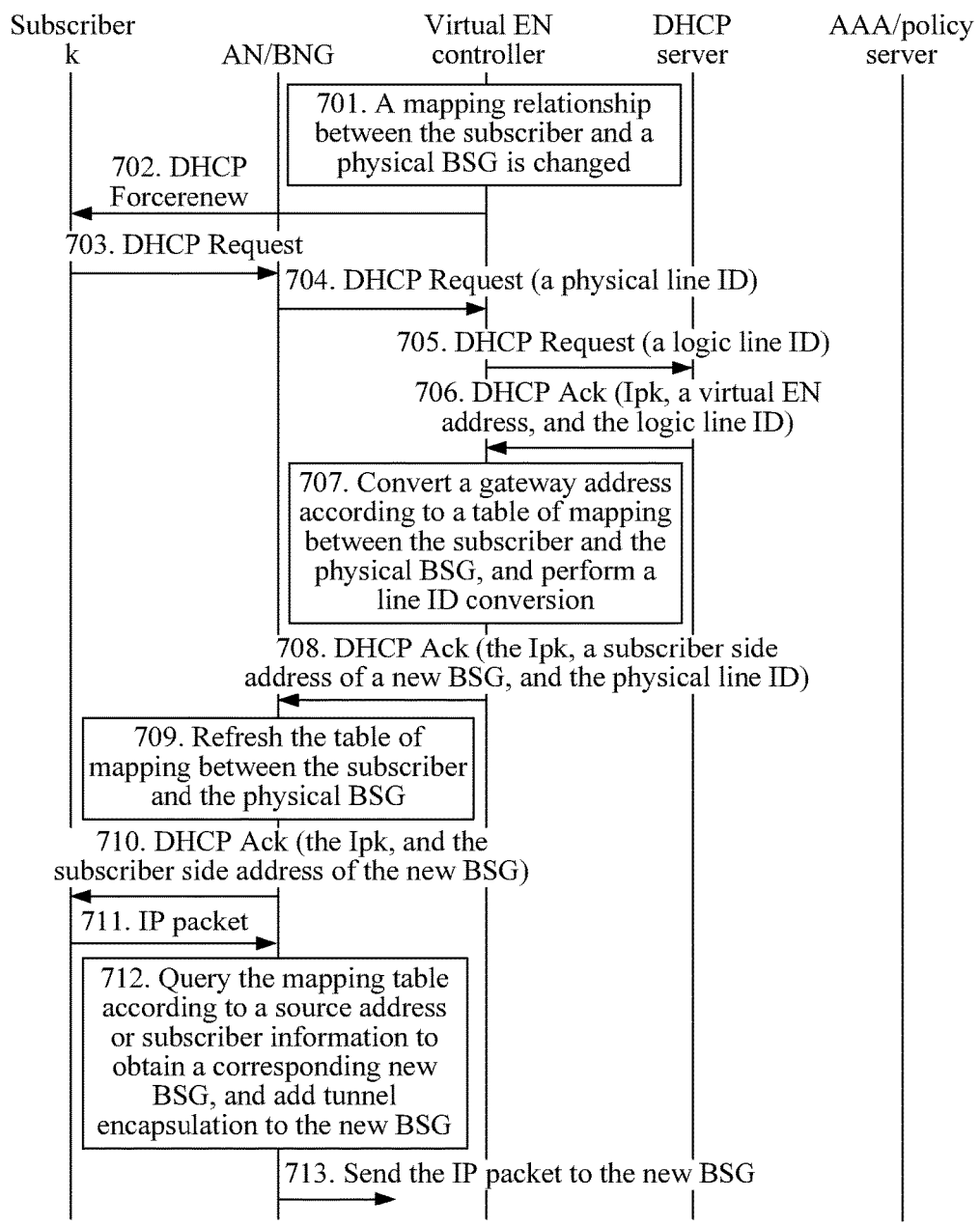
FIG. 14 is a signaling diagram 2 of a changing process of an edge node in a method for allocating an edge node according to an embodiment of the present invention.

FIG. 14 is a signaling diagram 2 of a changing process of a BSG in a method for allocating an edge node according to an embodiment of the present invention, and as shown in the figure, with reference to FIG. 9, the changing process of a BSG in the embodiment of the present invention specifically includes the following steps:

Step 701: A mapping relationship between a subscriber and a physical BSG is changed, for example, because of disaster recovery backup or green energy-saving requirements, the subscriber is required to be migrated to another BSG, or during load balancing, the physical BSG is changed.

The process of step 702 to step 708 is completely the same as that of step 605 to step 611 in the foregoing embodiment of a changing process of a BSG.

Step 709: The BNG refreshes a subscriber side address of a BSG in the table of mapping between the subscriber and the BSG, such as Table 3.

The process of step 710 to step 713 is completely the same as that of step 612 to step 615 in the foregoing embodiment of a changing process of a BSG.

Differences between the changing process of the BSG in this embodiment and the changing process of the BSG in the foregoing embodiment are described as follows: the first one is that, the subscriber side address of the changed BSG in the foregoing embodiment is first sent to the BNG (through the CoA Request), and then, is sent to the subscriber (through the DHCP Forcerenew); while the subscriber side address of the changed BSG in this embodiment is first sent to the subscriber (through the DHCP Forcerenew), and then, is sent to the BNG (through the DHCP Ack); and the second one is that, the subscriber side address of the changed BSG in the foregoing embodiment is sent to the BNG through the AAA message, CoA Request and the DHCP message, DHCP Ack, while the subscriber side address of the changed BSG in this embodiment is sent to the BNG only through the DHCP message, DHCP Ack; therefore, a processing process is much simpler.

In the foregoing two embodiments of a changing process of a BSG, the DHCP server also only perceives the virtual EN and does not perceive the change of the BSG, while the subscriber side perceives the change of the BSG.

Figure 15:
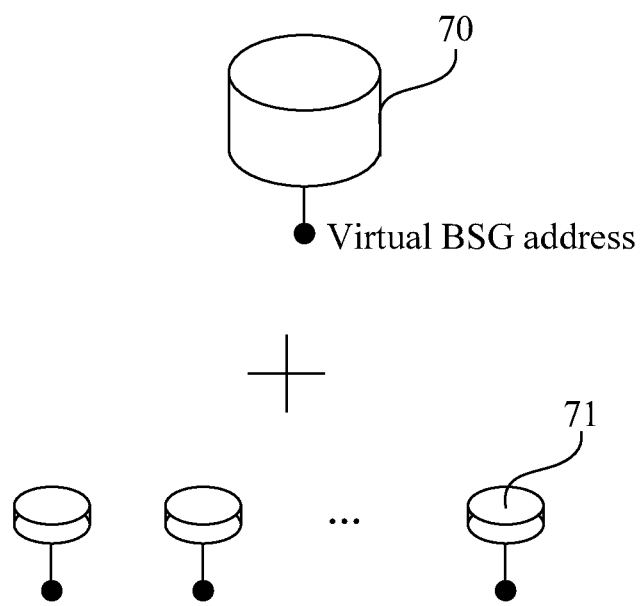
FIG. 15 is a subscriber logic view corresponding to another method for allocating an edge node according to an embodiment of the present invention.

In the foregoing several embodiments, for the subscriber side, the physical address of the BSG can be learned. FIG. 15 is a subscriber logic view corresponding to another edge node according to an embodiment of the present invention. For the subscriber, a subscriber side address of a BNG71 can be seen; however, the subscriber can only see an address of a virtual BSG70 but cannot see a subscriber side address of the BSG.

The advantage of adopting a virtual BSG address is that, the subscriber cannot perceive the disaster recovery, or because of green energy-saving requirements, the subscriber is required to be migrated to another BSG, or during load balancing, a physical BSG is changed. For example, when a first physical BSG breaks down, a subscriber served by the first physical BSG needs to be switched to another physical BSG, and a design objective is that the subscriber does not need to perceive a change of the BSG. Therefore, in the embodiment of the present invention, another edge node adopts a virtual BSG address, and the subscriber can only see the virtual BSG address, and an address of the physical BSG is shielded for the subscriber. Here, a change of the physical BSG should be limited in the same virtual EN; in this way, the subscriber does not perceive the change of the BSG, and in this way, during disaster recovery, green energy-saving, or load balancing, although the physical BSG is changed, the virtual BSG address is not changed to ensure that a subscriber service is not interrupted in a switching process of the BSG.

For a specific processing process, a difference between the another edge node in the embodiment of the present invention and the edge node in the second and third embodiments that correspond to FIG. 9 lies in that, the DHCP information (such as the DHCP Offer, DHCP Ack) sent by the BNG to the subscriber carries the virtual BSG address (which may be the same as the virtual EN address) instead of the subscriber side address of the physical BSG; therefore, when the BSG is changed, the subscriber does not perceive.

Figure 16A:
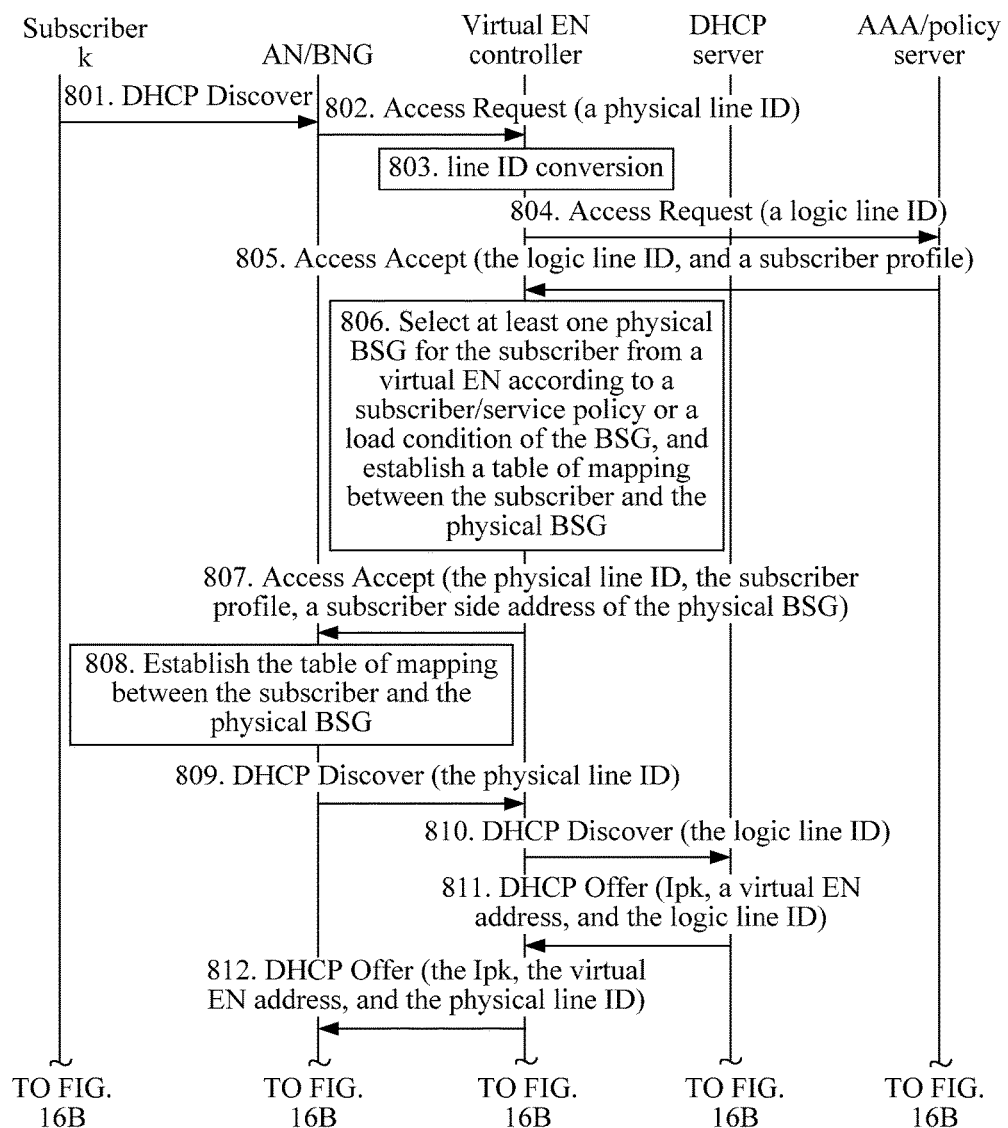
FIG. 16A and FIG. 16B are a signaling diagram 1 of another method for allocating an edge node according to an embodiment of the present invention.
Figure 16B:
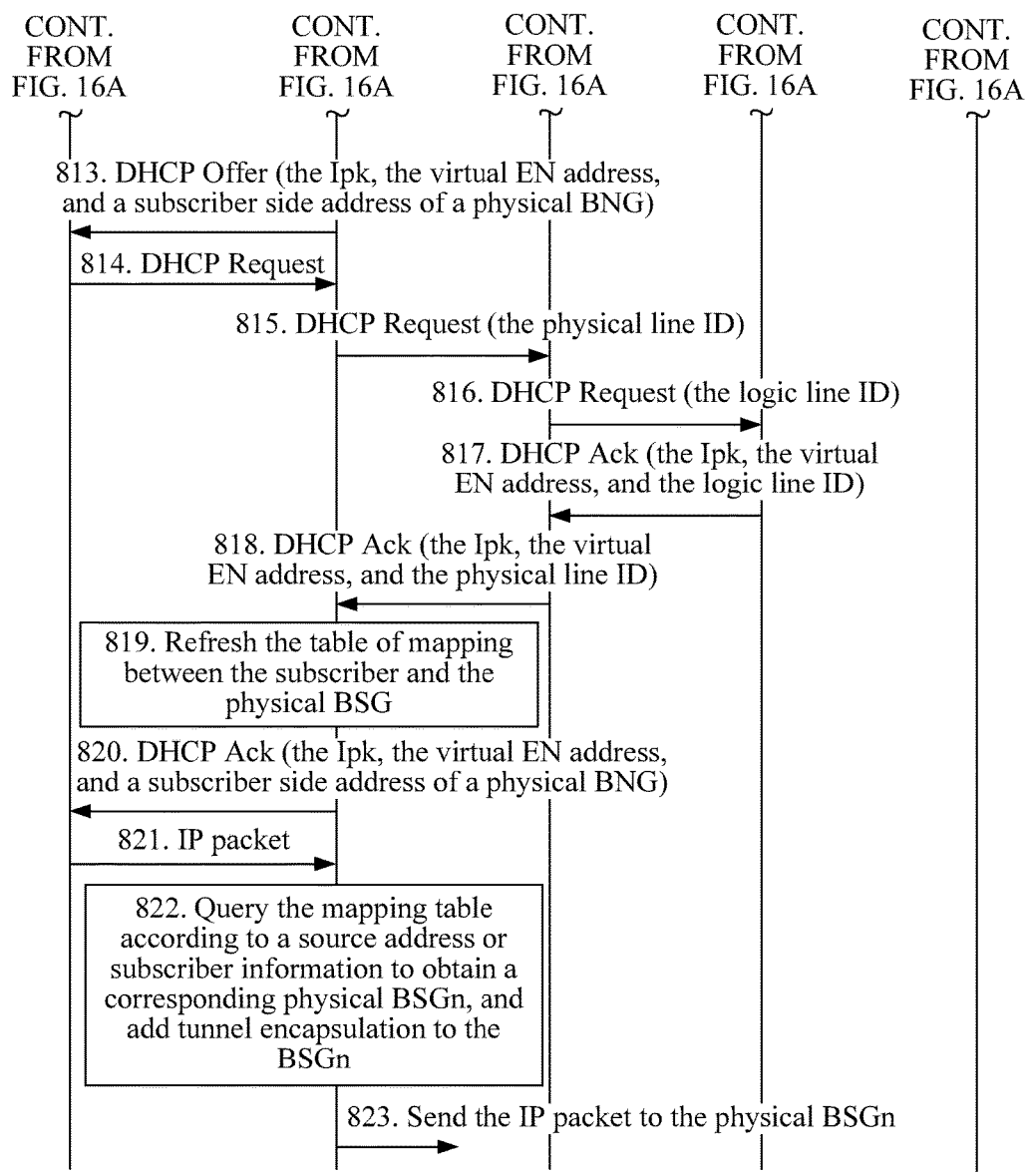

FIG. 16A and FIG. 16B are a signaling diagram 1 of another method for allocating an edge node according to an embodiment of the present invention, and with reference to FIG. 15, for allocation of an edge node in this embodiment, allocation of a BSG is taken as an example, and the method for allocating an edge node in the embodiment of the present invention specifically includes the following steps:

Step 801 to step 811 are the same as step 501 to step 511 in the third embodiment of the method for allocating an edge node in the embodiment of the present invention that corresponds to FIG. 12A and FIG. 12B.

Step 812: The virtual EN controller extracts the DHCP offer/Advertise message from the DHCP relay message, sends the virtual BSG address (which may be the same as the virtual EN address) and the logic access loop identifier to the BNG, or the virtual EN controller converts the logic access loop identifier carried in the DHCP offer/Advertise message to the physical access loop identifier, and then forwards the DHCP offer/Advertise message with the virtual BSG address to the subscriber.

Step 813: The BNG sends the virtual BSG address and the physical BNG address to the subscriber.

Step 814 to step 817 are completely the same as step 515 to step 518 in the third embodiment of the method for allocating an edge node in the embodiment of the present invention that corresponds to FIG. 12A and FIG. 12B.

Step 818: The virtual EN controller extracts the DHCP Ack/Reply message from the DHCP relay message, sends the virtual BSG address (which may be the same as the virtual EN address) and the logic access loop identifier to the BNG, or the virtual EN controller converts the logic access loop identifier carried in the Ack/Reply message to the physical access loop identifier, and then forwards the DHCP Ack/Reply message with the virtual BSG address to the BNG.

Step 819: The virtual EN controller performs DHCP listening to obtain a subscriber IP address, refreshes a subscriber IP address item in the table of mapping between the subscriber and the BSG, and adds a subscriber address into Table 3.

Step 820: The BNG forwards the DHCP Ack/Reply message, and sends the virtual BSG address and the subscriber side address of the physical BNG to the subscriber.

Step 821: The subscriber sends an IP packet.

Step 822: Query the mapping Table 3 according to a source address or subscriber information (such as a subscriber MAC address (MACk) or a subscriber IP address (IPk)) or other subscriber information (such as a line ID/subscriber VLAN) to obtain a corresponding physical BSG, and add tunnel encapsulation to the BSG.

Optionally, if a destination address of the IP packet is the virtual EN address, a corresponding BSG address is obtained by querying, according to the subscriber information, Table 3, and the destination address is converted from the virtual EN address into the BSG address.

Step 823: Forward the IP packet of the subscriber to the corresponding BSG through the BNG.

In this embodiment, Table 3 is established by the BNG, and it may be established by the EN controller in another manner. In step 817, the EN controller performs the DHCP listening to obtain the subscriber IP address, and establishes Table 3 in the virtual EN controller, then, the virtual EN controller delivers, through the AAA (such as a Diameter protocol or an Openflow protocol) message, a relevant subscriber item in Table 3 to the BNG or a node connected to multiple BSGs; in this way, the BNG does not need to refresh Table 3 of mapping between the subscriber and the physical BSG in step 819, thereby reducing the implementation complexity of the BNG. In step 817, the AAA message does not need to carry the subscriber side address of the physical BSG.

In this embodiment, the BSG address corresponding to the subscriber (access loop identifier) is delivered to the BNG by using the AAA process. In the AAA authentication process, the virtual EN controller plays a role for selecting the BSG according to a subscriber online requirement, and can dynamically enable the BNG to learn the mapping relationship between the subscriber and the BSG; therefore, distribution selection and calculation may be not performed on each packet in a subsequent process of a subscriber session, and the packet is directly forwarded according to the mapping relationship between the subscriber and the BSG, thereby reducing the implementation complexity of the BNG, and removing the labor costs of statically configuring the mapping relationship between the subscriber and the BSG on the BNG. The DHCP information (DHCP Offer and DHCP Ack) sent by the BNG to the subscriber carries the virtual BSG address (which may be the same as the virtual EN address) instead of the subscriber side address of the physical BSG; therefore, when the BSG is changed, the subscriber does not perceive.

The foregoing embodiment is another process of allocating and delivering a BSG, and definitely, during work, the BSG may be changed, and the following is a changing procedure of the BSG.

Figure 17:
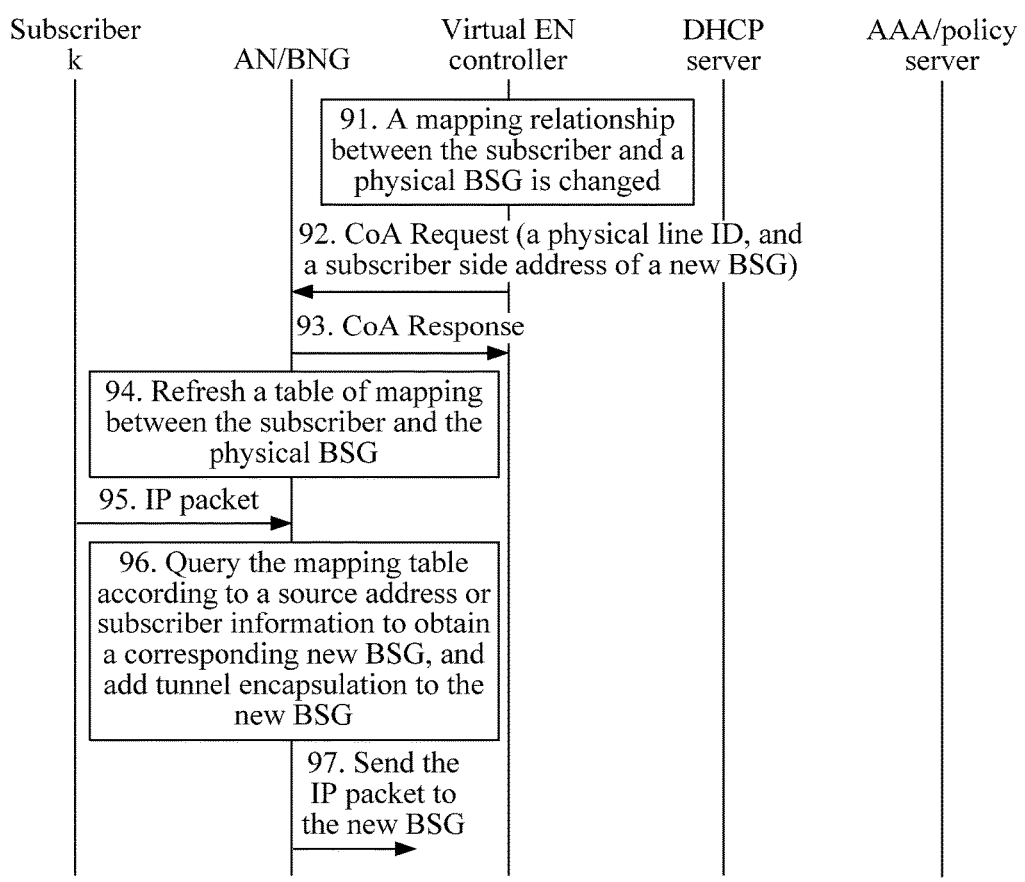
FIG. 17 is a signaling diagram 1 of a changing process of an edge node in another method for allocating an edge node according to an embodiment of the present invention.

FIG. 17 is a signaling diagram 1 of a changing process of a BSG in another method for allocating an edge node according to an embodiment of the present invention, and as shown in the figure, with reference to FIG. 15, the changing process of a BSG in this embodiment specifically includes the following steps:

Step 91: A mapping relationship between a subscriber and a physical BSG is changed, for example, because of disaster recovery backup or green energy-saving requirements, the subscriber is required to be migrated to another BSG, or during load balancing, the physical BSG is changed.

Step 92: A virtual EN controller sends an AAA message, such as a Change of Authorization (CoA, change of authorization) Request message, which carries a physical access loop identifier and a subscriber side address of a new BSG that corresponds to the physical access loop identifier.

Step 93: A BNG replies to the AAA message such as a Change of Authorization (CoA, change of authorization) Response message.

Step 94: The BNG refreshes a subscriber side address of a BSG in a table of mapping between the subscriber and the BSG, such as Table 3, according to an extended service gateway attribute of the AAA message.

Step 95: The subscriber sends an IP packet.

Step 96: Query the Table 3 according to a source address or subscriber information (such as a subscriber MAC address or a subscriber IP address) or other subscriber information (such as a line ID/subscriber VLAN) to obtain a corresponding new physical BSG, and add tunnel encapsulation to the BSG.

Optionally, if a destination address of the IP packet is a virtual EN address, a corresponding BSG address is obtained by querying, according to the subscriber information, Table 3, and the destination address is converted from the virtual EN address into the BSG address.

Step 97: Forward the IP packet of the subscriber to the corresponding new BSG through the BNG.

In this embodiment, when Table 3 of the mapping relationship between the subscriber and the physical BSG is changed, the virtual EN controller directly refreshes or updates Table 3 of mapping between the subscriber and the physical BSG according to Table 3, then, the virtual EN controller delivers, through the AAA (such as a Diameter protocol or an Openflow protocol) message, Table 3 to the BNG or a node connected to multiple BSGs, and then, initiates step 905.

In this embodiment, although the physical BSG is changed, the virtual BSG address is not changed to ensure that a subscriber service is not interrupted in a switching process of the BSG.

Figure 18:
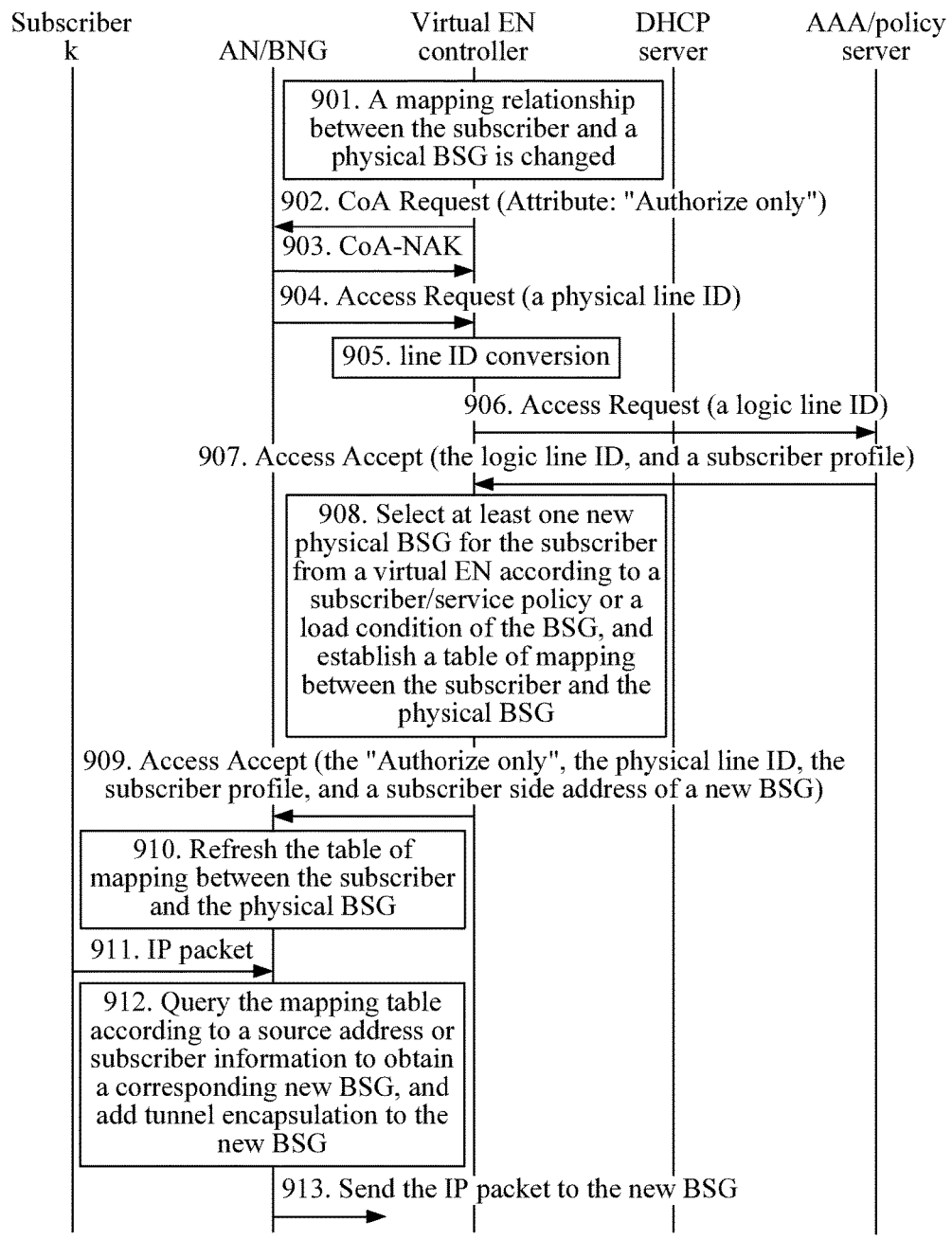
FIG. 18 is a signaling diagram 2 of a changing process of an edge node in another method for allocating an edge node according to an embodiment of the present invention.

FIG. 18 is a signaling diagram 2 of a changing process of a BSG in another method for allocating an edge node according to an embodiment of the present invention, and as shown in the figure, with reference to FIG. 15, the changing process of a BSG in this embodiment specifically includes the following steps:

Step 901: A mapping relationship between a subscriber and a physical BSG is changed, for example, because of disaster recovery backup or green energy-saving requirements, the subscriber is required to be migrated to another BSG, or during load balancing, the physical BSG is changed.

Step 902: An EN controller sends an AAA message such as a Change of Authorization (CoA) Request message to a BNG, which carries an Authorization only attribute.

Step 903: The BNG replies to the AAA message such as a Change of Authorization (CoA) negative acknowledgement (NAK) message for the EN controller.

Step 904: A virtual EN controller sends an AAA message, such as an Access Request message, which carries a physical access loop identifier and a subscriber side address of a new BSG that corresponds to the physical access loop identifier.

Step 905: Convert a physical Line ID into a logic line ID.

Step 906: The EN controller carries the logic line ID in an AAA protocol message (such as an Access Request), and sends the message to an AAA server.

Step 907: Subscriber authentication succeeds, the AAA server returns the AAA protocol message (such as the Access Accept) to the EN controller, where the AAA message carries a logic access loop identifier and a corresponding subscriber/service profile (or policy).

Step 908: Establish a table of mapping between the subscriber and the BSG, such as Table 3, according to an extended service gateway attribute of the AAA message, except a subscriber IP address, other items can be learned so far, and similarly, different services are differentiated through different VLANs, or services may be differentiated in another manner, for example, through an Ethernet priority or an MPLS label.

Step 909: The EN controller sends the AAA message to the BNG, which carries the physical access loop identifier, the service profile, the Authorization only attribute, and the subscriber side address of the new BSG.

Step 910: The BNG refreshes a subscriber side address of a BSG in the table of mapping between the subscriber and the BSG, such as Table 3, according to the extended service gateway attribute of the AAA message.

Step 911: The subscriber sends an IP packet.

Step 912: Query the mapping Table 3 according to a source address or subscriber information (such as a subscriber MAC address MACk or a subscriber IP address IPk) or other subscriber information (such as a line ID/subscriber VLAN) to obtain a corresponding new physical BSG, and add tunnel encapsulation to the BSG.

Step 913: Forward the IP packet of the subscriber to the corresponding new BSG through the BNG.

In this embodiment, in the procedure of the BSG changing, AAA re-authorization is initiated by triggering the BNG to refresh the table of mapping between the subscriber and the BSG on the BNG. Similarly, although the physical BSG is changed, the virtual BSG address is not changed to ensure that a subscriber service is not interrupted in a switching process of the BSG.

For the above description of the edge node, how to allocate an EN is described from the perspective of a processing method, and the following describes an apparatus for allocating an edge node.

Figure 19:
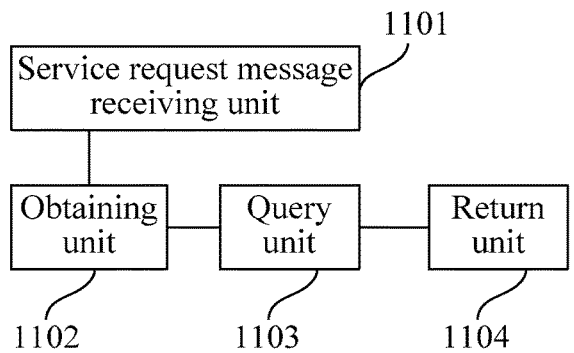
FIG. 19 is a schematic diagram 1 of an apparatus for allocating an edge node according to an embodiment of the present invention.

FIG. 19 is a schematic diagram 1 of an apparatus for allocating an edge node according to an embodiment of the present invention, and as shown in the figure, for allocation of an edge node in this embodiment, allocation of a BSG is taken as an example, and the apparatus for allocating an edge node in the embodiment of the present invention specifically includes a service request message receiving unit 1101, an obtaining unit 1102, a query unit 1103, and a return unit 1104.

The service request message receiving unit 1101 receives a service request message including a physical subscriber identifier; the obtaining unit 1102 obtains the physical subscriber identifier in the service request message; the query unit 1103 queries a first mapping relationship between the physical subscriber identifier and a BSG address according to the physical subscriber identifier to obtain a BSG address corresponding to the physical subscriber identifier; and the return unit 1104 returns a service response message including the BSG address.

The apparatus for selecting a BSG in the embodiment of the present invention uses a physical subscriber identifier carried in a service request message to query a first mapping relationship to obtain a BSG address, and delivers a service response message carrying the BSG address, thereby implementing unified allocation of the BSG address, reducing a processing process of identifying different BSGs by an external server, improving the processing efficiency, and reducing the implementation complexity.

Figure 20:
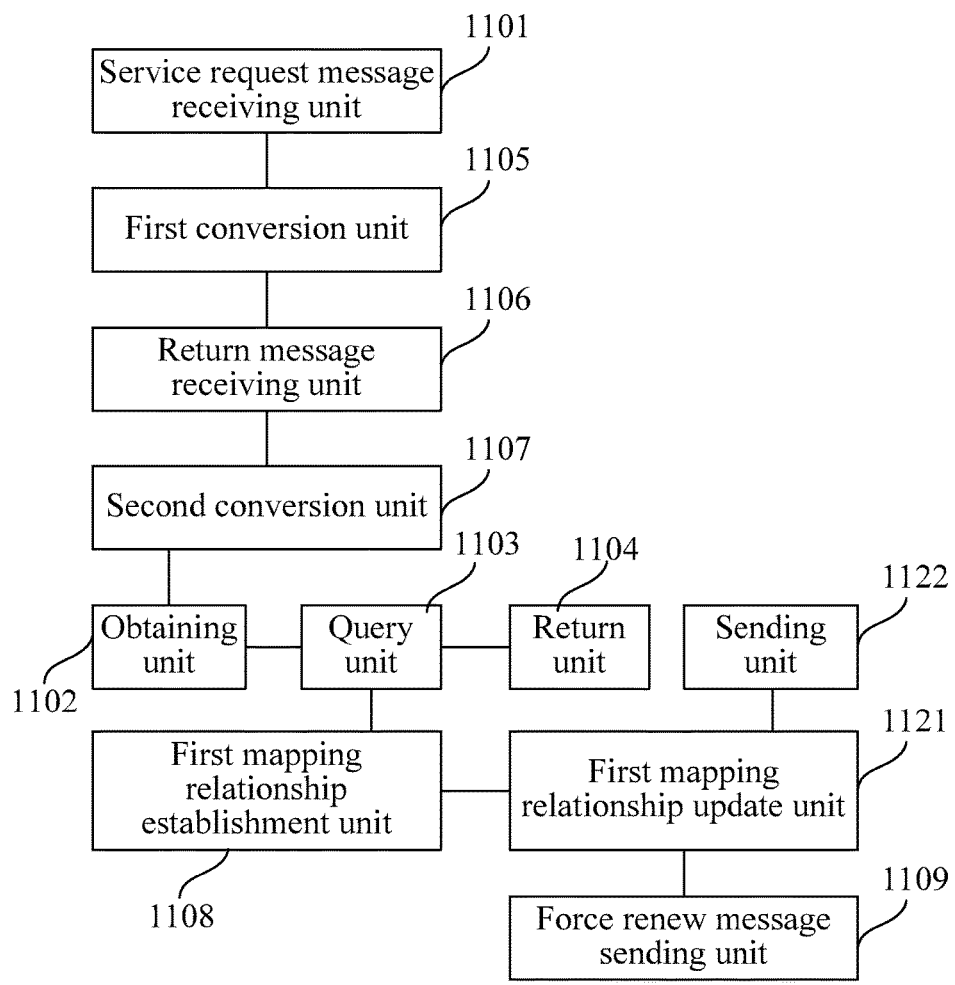
FIG. 20 is a schematic diagram 2 of an apparatus for allocating an edge node according to an embodiment of the present invention.

FIG. 20 is a schematic diagram 2 of an apparatus for allocating an edge node according to an embodiment of the present invention, and as shown in the figure, for allocation of an edge node in this embodiment, allocation of a BSG is taken as an example, and the apparatus for allocating an edge node in the embodiment of the present invention specifically includes a service request message receiving unit 1101, an obtaining unit 1102, a query unit 1103, a return unit 1104, a first conversion unit 1105, a response message receiving unit 1106, a second conversion unit 1107, and a first mapping relationship establishment unit 1108.

The service request message receiving unit 1101 receives a service request message including a physical subscriber identifier; the first conversion unit 1105 converts the physical subscriber identifier into a logic subscriber identifier, and forwards a service request message including the logic subscriber identifier; the response message receiving unit 1106 receives a service request including the logic subscriber identifier; the second conversion unit 1107 converts the logic subscriber identifier into the physical subscriber identifier; the obtaining unit 1102 obtains the physical subscriber identifier in the service request message; the first mapping relationship establishment unit 1108 establishes a first mapping relationship between the physical subscriber identifier and a BSG address; the query unit 1103 queries the first mapping relationship between the physical subscriber identifier and the BSG address according to the physical subscriber identifier to obtain a BSG address corresponding to the physical subscriber identifier; and the return unit 1104 returns a service response message including the BSG address.

The first mapping relationship establishment unit 1108 is specifically configured to establish the first mapping relationship between the physical subscriber identifier and the BSG address according to a service policy, a load balancing policy, or a disaster recovery backup policy. The service request message received by the service request message receiving unit 1101 is specifically a subscriber authentication message, and the service response message returned by the return unit 1104 is specifically a subscriber authentication receiving message; or the service request message received by the service request message receiving unit 1101 is an address allocation discovery message or an address allocation request message, and the service response message returned by the return unit 1104 is specifically an address allocation service confirmation message.

As shown in FIG. 20, the apparatus for allocating an edge node in the embodiment of the present invention further includes a first mapping relationship update unit 1121, a sending unit 1122, and a force renew message sending unit 1109.

The first mapping relationship update unit 1121 updates the first mapping relationship when the BSG address corresponding to the physical subscriber identifier is changed; the sending unit 1122 sends an updated BSG address corresponding to the physical subscriber identifier; and the force renew message sending unit 1109 sends a force renew message. Because, at this time, the BSG address corresponding to the physical subscriber identifier is changed, that is, the BSG corresponding to the subscriber is changed, the force renew message sending unit 1109 notifies, by sending the force renew message to the subscriber, that the BSG address corresponding to the subscriber is changed.

The apparatus for selecting a BSG in the embodiment of the present invention uses a physical subscriber identifier carried in a service request message to query a first mapping relationship established by the apparatus to obtain a BSG address, and delivers a service response message carrying the BSG address, thereby implementing unified allocation of the BSG address. When a BSG is changed, a changed BSG address is received, and the first mapping relationship is updated. Therefore, a processing process of identifying different BSG by an external server is reduced, the processing efficiency is improved, and the implementation complexity is reduced.

Figure 21:
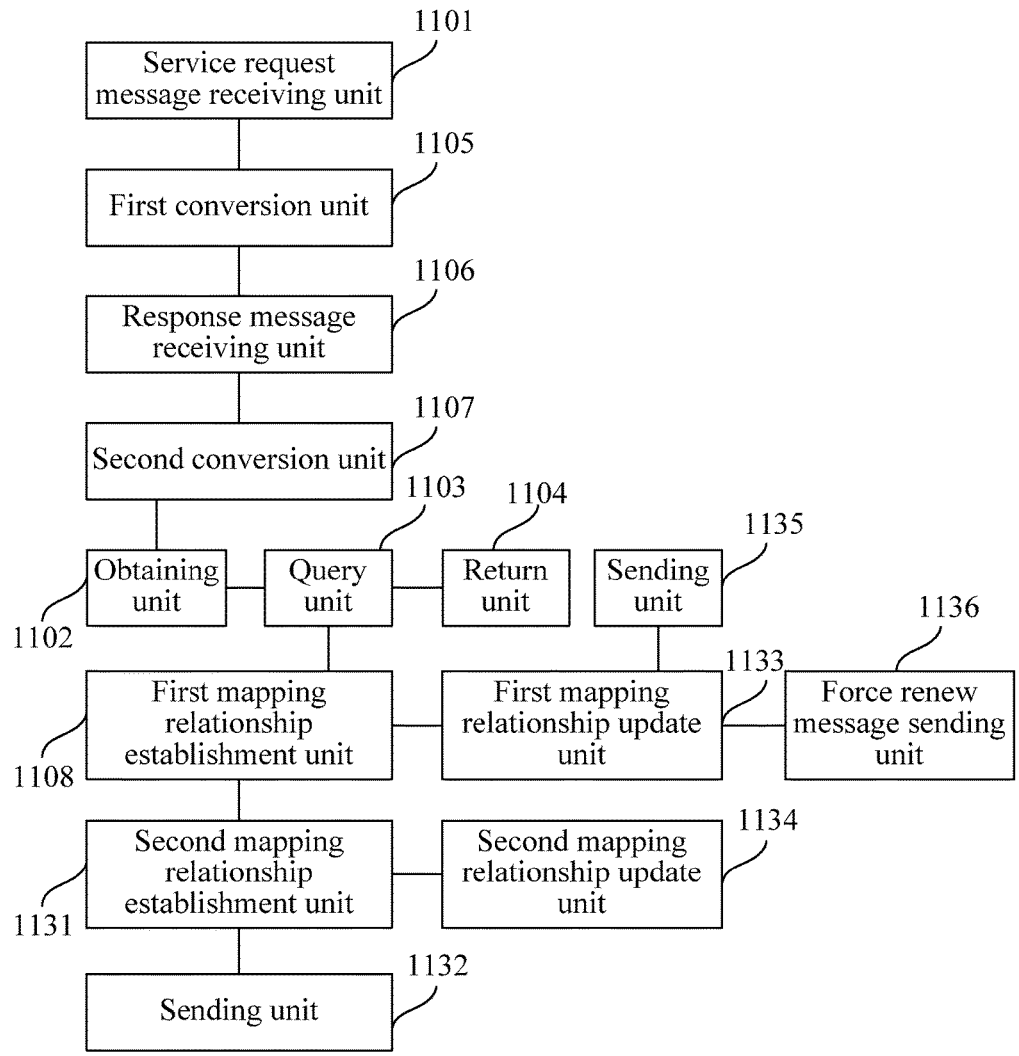
FIG. 21 is a schematic diagram 3 of an apparatus for allocating an edge node according to an embodiment of the present invention.

FIG. 21 is a schematic diagram 3 of an apparatus for allocating an edge node according to an embodiment of the present invention, and as shown in the figure, for allocation of an edge node in this embodiment, allocation of a BSG is taken as an example, and the apparatus for allocating an edge node in the embodiment of the present invention specifically includes a service request message receiving unit 1101, an obtaining unit 1102, a query unit 1103, a return unit 1104, a first conversion unit 1105, a response message receiving unit 1106, a second conversion unit 1107, a first mapping relationship establishment unit 1108, a second mapping relationship establishment unit 1131, and a sending unit 1132.

The service request message receiving unit 1101 receives a service request message including a physical subscriber identifier; the first conversion unit 1105 converts the physical subscriber identifier into a logic subscriber identifier, and forwards a service request message including the logic subscriber identifier; the response message receiving unit 1106 receives a service request including the logic subscriber identifier; the second conversion unit 1107 converts the logic subscriber identifier into the physical subscriber identifier; the obtaining unit 1102 obtains the physical subscriber identifier in the service request message; the first mapping relationship establishment unit 1108 establishes a first mapping relationship between the physical subscriber identifier and a BSG address; the query unit 1103 queries the first mapping relationship between the physical subscriber identifier and the BSG address according to the physical subscriber identifier to obtain a BSG address corresponding to the physical subscriber identifier; and the return unit 1104 returns a service response message including the BSG address.

Specifically, the first mapping relationship establishment unit 1108 is specifically configured to establish the first mapping relationship between the physical subscriber identifier and the BSG address according to a service policy, a load balancing policy, or a disaster recovery backup policy. The service request message received by the service request message receiving unit 1101 is specifically a subscriber authentication message, and the service response message returned by the return unit 1104 is specifically a subscriber authentication receiving message; or the service request message received by the service request message receiving unit 1101 is an address allocation discovery message or an address allocation request message, and the service response message returned by the return unit 1104 is specifically an address allocation service confirmation message.

The second mapping relationship establishment unit 1131 establishes a second mapping relationship among a subscriber address, the physical subscriber identifier, and the BSG address; and the sending unit 1132 sends the second mapping relationship. In addition, the second mapping relationship establishment unit may only establish a second mapping relationship between the physical subscriber identifier and the BSG address, obtains the subscriber address by using the obtaining unit, and adds the subscriber address into the second mapping relationship. The second mapping relationship is established by the second mapping relationship establishment unit 1131, and subsequently, the second mapping relationship needs to be delivered; in this way, a receiver does not need to establish the second mapping relationship but only needs to receive the second mapping relationship. When receiving an IP packet, the receiver queries the second mapping relationship to obtain a BSG corresponding to the subscriber sending the IP packet, and then sends the IP packet to the BSG.

As shown in FIG. 21, the apparatus for allocating an edge node in the embodiment of the present invention further includes a first mapping relationship update unit 1133, a second mapping relationship update unit 1134, a sending unit 1135, and a force renew message sending unit 1136.

The first mapping relationship update unit 1133 updates the first mapping relationship when the BSG address corresponding to the physical subscriber identifier is changed; the second mapping relationship update unit 1134 updates the second mapping relationship according to the updated first mapping relationship; and the sending unit 1135 sends the updated second mapping relationship. The force renew message sending unit 1136 sends a force renew message. Because, at this time, the BSG address corresponding to the physical subscriber identifier is changed, that is, the BSG corresponding to the subscriber is changed, the force renew message sending unit 1136 notifies, by sending the force renew message to the subscriber, that the BSG address corresponding to the subscriber is changed.

The apparatus for selecting a BSG in the embodiment of the present invention establishes a first mapping relationship and a second mapping relationship, uses a physical subscriber identifier carried in a service request message to query the first mapping relationship to obtain a BSG address, and delivers a service response message carrying the BSG address, thereby implementing unified allocation of the BSG address. When the BSG is changed, a changed BSG address is received, and the first mapping relationship and the second mapping relationship are updated, thereby reducing a processing process of identifying different BSGs by an external server, and improving the processing efficiency. The second mapping relationship needs to be delivered to a receiver, and the second mapping relationship is received and maintained by the receiver without establishing the second mapping relationship.

Figure 22:
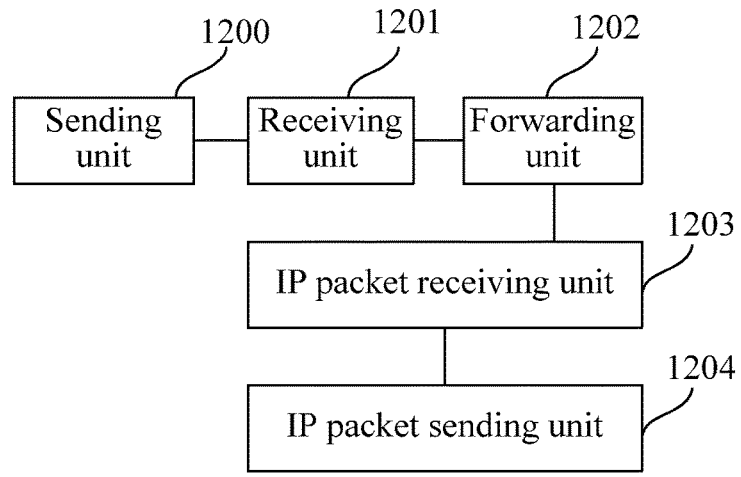
FIG. 22 is a schematic diagram 1 of another apparatus for allocating an edge node according to an embodiment of the present invention.

FIG. 22 is a schematic diagram 1 of another apparatus for allocating an edge node according to an embodiment of the present invention, and as shown in the figure, for allocation of an edge node in this embodiment, allocation of a BSG is taken as an example, and the apparatus for allocating an edge node in the embodiment of the present invention specifically includes a sending unit 1200 and a receiving unit 1201.

The sending unit 1200 sends a service request message including a physical subscriber identifier; and the receiving unit 1201 receives a service response message including a BSG address, where the BSG address is a BSG address corresponding to a physical access loop identifier.

As show in FIG. 22, the apparatus for allocating an edge node in the embodiment of the present invention further includes a forwarding unit 1202, an IP packet receiving unit 1203, and an IP packet sending unit 1204.

The forwarding unit 1202 forwards the service response message including the BSG address. The IP packet receiving unit 1203 receives an IP packet including the BSG address; and the IP packet sending unit 1204 forwards, according to the BSG address, the IP packet to a BSG corresponding to the BSG address.

Another apparatus for selecting a BSG in the embodiment of the present invention sends a service request message including a physical subscriber identifier and receives a service response message carrying a BSG address to implement unified allocation of the BSG address. Therefore, a processing process of identifying different BSG by an external server is reduced, and the processing efficiency is improved. When an IP packet is received, the IP packet is forwarded according to the BSG address in the packet.

Figure 23:
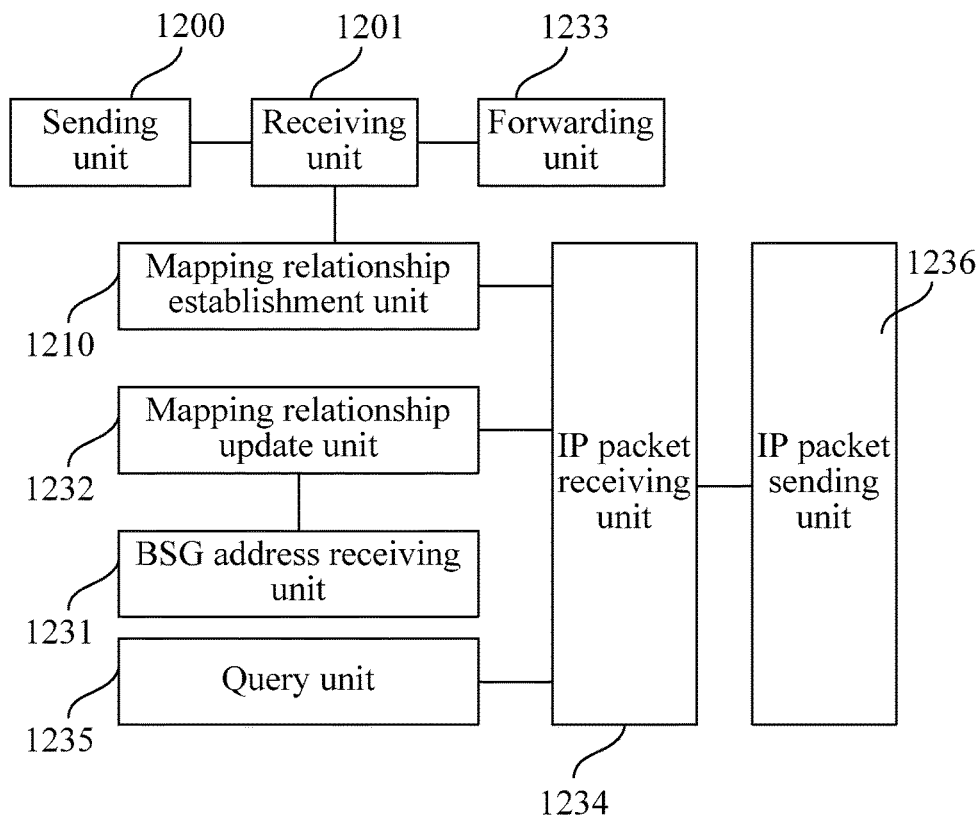
FIG. 23 is a schematic diagram 2 of another apparatus for allocating an edge node according to an embodiment of the present invention.

FIG. 23 is a schematic diagram 2 of another apparatus for allocating an edge node according to an embodiment of the present invention, and as shown in the figure, for allocation of an edge node in this embodiment, allocation of a BSG is taken as an example, and the apparatus for allocating an edge node in the embodiment of the present invention specifically includes a sending unit 1200, a receiving unit 1201, a mapping relationship establishment unit 1210, a BSG address receiving unit 1231, a mapping relationship update unit 1232, a forwarding unit 1233, an IP packet receiving unit 1234, a query unit 1235, and an IP packet sending unit 1236.

The sending unit 1200 sends a service request message including a physical subscriber identifier; and the receiving unit 1201 receives a service response message including a BSG address, where the BSG address is a BSG address corresponding to a physical access loop identifier.

The mapping relationship establishment unit 1210 establishes a mapping relationship among a subscriber address, the physical subscriber identifier, and the BSG address; when a BSG address corresponding to the physical subscriber identifier is changed, the BSG address receiving unit 1231 receives an updated BSG address corresponding to the physical subscriber identifier; and the mapping relationship update unit 1232 updates the mapping relationship according to the updated BSG address. In addition, the mapping relationship establishment unit may only establish a mapping relationship between the physical subscriber identifier and the BSG address, and then, an adding unit obtains the subscriber address, and adds the subscriber address into a second mapping relationship.

The forwarding unit 1233 forwards the service response message including the BSG address, or is configured to convert the BSG address into a virtual BSG address, and forward a service request message including the virtual BSG address, or is configured to forward a service response message including a virtual edge node address corresponding to an edge node address. The IP packet receiving unit 1234 receives an IP packet including the subscriber address; the query unit 1235 queries the mapping relationship according to the subscriber address in the IP packet to obtain a BSG address corresponding to the subscriber address; and the IP packet sending unit 1236 sends the IP packet to a BSG corresponding to the BSG address.

Another apparatus for selecting a BSG in the embodiment of the present invention sends a service request message including a physical subscriber identifier and receives a service response message carrying a BSG address to implement unified allocation of the BSG address. In addition, a mapping relationship is established, and when the BSG is changed, a changed BSG address is received, and the mapping relationship is updated, thereby reducing a processing process of identifying different BSGs by an external server, and improving the processing efficiency. When an IP packet is received, a second mapping relationship is queried, and the IP packet is forwarded to the BSG address.

Figure 24:
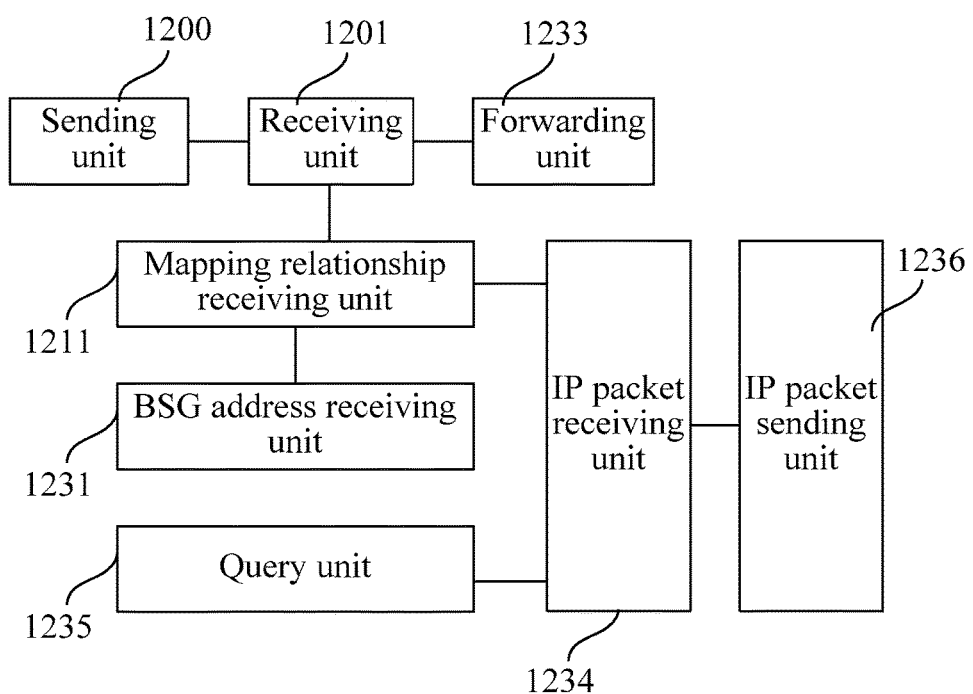
FIG. 24 is a schematic diagram 3 of another apparatus for allocating an edge node according to an embodiment of the present invention.

FIG. 24 is a schematic diagram 3 of another apparatus for allocating an edge node according to an embodiment of the present invention, and as shown in the figure, the apparatus for allocating an edge node in the embodiment of the present invention specifically includes a sending unit 1200, a receiving unit 1201, a mapping relationship receiving unit 1211, a BSG address receiving unit 1231, a forwarding unit 1233, an IP packet receiving unit 1234, a query unit 1235, and an IP packet sending unit 1236.

The sending unit 1200 sends a service request message including a physical subscriber identifier; and the receiving unit 1201 receives a service response message including a BSG address, where the BSG address is a BSG address corresponding to a physical access loop identifier.

The mapping relationship receiving unit 1211 receives a mapping relationship among a subscriber address, the physical subscriber identifier, and the BSG address, and in addition, when a BSG address corresponding to the physical subscriber identifier is changed, receives an updated mapping relationship.

The forwarding unit 1233 forwards the service response message including the BSG address, or is configured to convert the BSG address into a virtual BSG address, and forward a service response message including the virtual BSG address. The IP packet receiving unit 1234 receives an IP packet including the subscriber address; the query unit 1235 queries a second mapping relationship according to the subscriber address in the IP packet to obtain a BSG address corresponding to the subscriber address; and the IP packet sending unit 1236 sends the IP packet to a BSG corresponding to the BSG address.

Another apparatus for selecting a BSG in the embodiment of the present invention sends a service request message including a physical subscriber identifier and receives a service response message carrying a BSG address to implement unified allocation of the BSG address. In addition, a mapping relationship is received, and when the BSG is changed, an updated mapping relationship is received, thereby reducing a processing process of identifying different BSGs by an external server, and improving the processing efficiency. When an IP packet is received, the mapping relationship is queried, and the IP packet is forwarded to the BSG address.

Persons skilled in the art may further appreciate that, in combination with the examples described in the embodiments disclosed herein, units and algorithm steps can be implemented by electronic hardware, computer software, or a combination thereof. In order to clearly describe the interchangeability between the hardware and the software, the foregoing has generally described compositions and steps of every embodiment according to functions. Whether the functions are executed by hardware or software depends on particular applications and design constraint conditions of the technical solutions. Persons skilled in the art may use different methods to implement the described functions for each particular application, but it should not be considered that, the implementation goes beyond the scope of the embodiments of the present invention.

The steps of a method or an algorithm described in combination with the embodiments disclosed herein may be implemented in hardware, in a software module executed by a processor, or in a combination of the two. The software module may be located in a Random Access Memory (RAM), a memory, a Read Only Memory (ROM), an Electrically Programmable ROM, an Electrically Erasable Programmable ROM, a register, a hard disk, a removable disk, a CD-ROM, or any other storage medium well-known in the art.

The objectives, technical solutions, and beneficial effects of the embodiments of the present invention are further described in detail in the foregoing specific embodiments. It should be understood that, the foregoing descriptions are only specific implementation manners of the embodiments of the present invention, but are not intended to limit the protection scope of the embodiments of the present invention. Any modification, equivalent replacement, or improvement made within the spirit and principle of the embodiments of the present invention shall fall within the protection scope of the embodiments of the present invention.

What is claimed is:

1. A communication method for allocating an edge node, the method comprising:
   receiving, by an edge node (EN) controller, a service request message sent from an access node (AN) device, wherein the service request message carries a physical access loop identifier that indicates a physical access loop on the AN device, wherein the EN controller and the AN device are interconnected through an Internet Protocol/Multi-Protocol Label Switching (IP/MPLS) network;
   generating, by the EN controller, a converted service request message by replacing the physical access loop identifier in the service request message with a logical access loop identifier, wherein the logical access loop identifier indicates a logical access loop on a virtual edge node (EN) device, and wherein the virtual EN device is configured to work as a single network element to a server in the process for allocating an edge node;
   forwarding, by the EN controller, the converted service request message to the server;
   receiving, by the EN controller, a service response message sent by the server, wherein the service response message carrying the logical access loop identifier;
   generating, by the EN controller, a converted service response message by replacing the logical access loop identifier in the service response message with the physical access loop identifier;
   querying, by the EN controller, a first mapping relationship between the physical access loop identifier and an edge node address to obtain an edge node address corresponding to the physical access loop identifier;
   adding, by the EN controller, the edge node address in the converted service response message; and
   returning, by the EN controller, the converted service response message carrying the edge node address to the AN device.

2. The method of claim 1, wherein before querying the first mapping relationship between the physical access loop identifier and the edge node address, the method further comprises establishing the first mapping relationship between the physical access loop identifier and the edge node address.

3. The method of claim 2, wherein after establishing the first mapping relationship between the physical access loop identifier and the edge node address, the method further comprises:
   establishing a second mapping relationship among a subscriber address, the physical access loop identifier, and the edge node address; and
   sending the second mapping relationship to the AN device.

4. The method of claim 1, further comprising:
   updating the first mapping relationship when the edge node address corresponding to the physical access loop identifier is changed; and
   sending an updated edge node address corresponding to the physical access loop identifier to the AN device.

5. The method of claim 4, wherein when the edge node address corresponding to the subscriber identifier is changed, the method further comprises sending a force renew message to a subscriber.

6. The method of claim 1, wherein the service request message is a subscriber authentication message and the returned service response message is a subscriber authentication acceptance message.

7. The method of claim 1, wherein the service request message is an address allocation discovery message, and wherein the returned service response message is an address allocation service confirmation message.

8. The method of claim 1, wherein the physical access loop identifier maps to a plurality of edge node addresses corresponding to a plurality of edge nodes, wherein the method further comprises:
   selecting at least one edge node of the plurality of edge nodes based on one or more of:
      a subscriber policy or service policy;
      a load condition of edge nodes and a load balancing policy;
      a fault condition of edge nodes, a load balancing policy, and a disaster recovery backup policy,
   wherein the edge node address in the converted service response message is an address of the at least one edge node.

9. The method of claim 1, wherein the service response message is an authentication, authorization, and accounting (AAA) message or a dynamic host configuration protocol (DHCP) message.

10. The method of claim 9, wherein the DHCP message comprises an extended option comprising the edge node address.

11. The method of claim 1, wherein the physical access loop identifier is coded based on a physical chassis number, rack number, frame number, slot number, sub-slot number, and port number of the AN device, and wherein the logical access loop identifier is coded based on a logic chassis number, rack number, frame number, slot number, sub-slot number, and port number on the virtual EN.

12. A communication method for allocating an edge node, the method comprising:
   sending, by an access node (AN) device, a service request message to an edge node (EN) controller device, wherein the service request message is sent by a subscriber or is triggered by the AN device according to another message sent by the subscriber, wherein the service request message carries a physical access loop identifier that indicates a physical access loop on the AN device, and wherein the EN controller and the AN device are interconnected through an Internet Protocol/ Multi-Protocol Label Switching (IP/MPLS) network;

receiving, by the AN device, a first service response message sent from the EN controller device, wherein the service response message carries the physical access loop and an edge node address corresponding to the physical access loop;

establishing, by the AN device, a mapping relationship among a subscriber address of the subscriber, the physical access loop identifier, and the edge node address;

forwarding, by the AN device, a second service response message to the subscriber, wherein the second service response message is the same as the first service response message or is generated based on the first service response message;

receiving, by the AN device, an Internet Protocol (IP) packet sent from a subscriber carrying the subscriber address;

querying, by the AN device, the mapping relationship according to the subscriber address carried in the IP packet to obtain the edge node address corresponding to the subscriber address; and forwarding, by the AN device according to the obtained edge node address, the IP packet to the edge node corresponding to the edge node address.

13. The method of claim 12, further comprising:
receiving an updated edge node address corresponding to the physical access loop identifier when the edge node address corresponding to the physical access loop identifier is changed; and
updating the mapping relationship according to the updated edge node address.

14. The method of claim 13, wherein when the edge node address carried in the first service response message is a real address that is used by the edge node to communicate with any other network entity, forwarding the second service response message to the subscriber comprises: generating a second service response message by replacing the real edge node address in the first service response with a virtual edge node address that used by the edge node to communicate with the subscriber, and
forwarding, by the AN device, the second service response message to the subscriber.

15. The method of claim 12, wherein establishing the mapping relationship among a subscriber address, the physical access loop identifier, and the edge node address comprises:
receiving a mapping relationship among the subscriber address, the physical access loop identifier, and the edge node address after receiving the service response message sent from the EN controller device; and
saving the received mapping relationship.

16. The method of claim 15, further comprising receiving an updated mapping relationship when the edge node address corresponding to the physical access loop identifier is changed.

17. The method of claim 12, wherein the received first service response message is a subscriber authentication acceptance message or an address allocation service confirmation message.

18. The method of claim 12, wherein the physical access loop identifier is coded based on a physical chassis number, rack number, frame number, slot number, sub-slot number, and port number of the AN device.

19. An edge node (EN) controller, comprising:
a memory configured to store instructions;
a network interface configured to receive a service request message sent from an access node (AN) device, wherein the service request message comprises a physical access loop identifier that indicates a physical access loop on the AN device, and wherein the EN controller and the AN device are interconnected through an Internet Protocol/Multi-Protocol Label Switching (IP/MPLS) network; and
a processor coupled to the memory and configured to execute the instructions stored in the memory to:
generate a converted service request message by replacing the physical access loop identifier in the service request message with a logical access loop identifier, wherein the logical access loop identifier indicates a logical access loop on a virtual EN device, and wherein the virtual EN device is configured to work as a single network element to a server in the process for allocating an edge node; and
instruct the network interface to forward the converted service request message to the server,
wherein the network interface is further configured to receive a service response message sent by the server,
wherein the service response message carries the logical access loop identifier, and
wherein the processor is further configured to:
generate a converted service response message by replacing the logical access loop identifier in the service response message with the physical access loop identifier;
query a first mapping relationship between the physical access loop identifier and an edge node address to obtain an edge node address corresponding to the physical access loop identifier;
add the edge node address in the converted service response message; and
instruct the network interface to return the converted service response message carrying the edge node address to the AN device.

20. The EN controller of claim 19, wherein the network interface is further configured to receive load information of the edge node, and wherein the processor is further configured to adjust the first mapping relationship according to the load information.

21. The EN controller of claim 19, wherein the network interface is further configured to receive fault information of the edge node, and wherein the processor is further configured to adjust the first mapping relationship according to the fault information.

22. The EN controller of claim 19, wherein the processor is further configured to:
establish a second mapping relationship among a subscriber address, the physical access loop identifier and the edge node address; and
sending the second mapping relationship to the AN device.

23. The EN controller of claim 19, wherein the processor is further configured to:
update the first mapping relationship when the edge node address corresponding to the physical access loop identifier is changed; and
send an updated edge node address corresponding to the physical access loop identifier to the AN device.

24. The EN controller of claim 19, wherein the service request message is an address allocation discovery message, and wherein the returned service response message is an address allocation service confirmation message.

25. The edge node controller of claim 19, wherein the instructions further cause the processor to:
  select at least one edge node based on one or more of:
    a subscriber policy or service policy;
    a load condition of edge nodes and a load balancing policy;
    a fault condition of edge nodes, a load balancing policy, and a disaster recovery backup policy,
  wherein the physical access loop identifier maps to multiple edge node addresses, wherein each of the edge nodes has an address in the multiple edge node addresses, and wherein the edge node address added in the converted service response message is an address of the selected edge node.

26. The edge node controller of claim 19, wherein the service response message is an authentication, authorization, and accounting (AAA) message or a dynamic host configuration protocol (DHCP) message.

27. The edge node controller of claim 26, wherein the DHCP message comprises an extended option comprising the edge node address.

28. The edge controller of claim 19, wherein the physical access loop identifier is coded based on a physical chassis number, rack number, frame number, slot number, sub-slot number, and port number of the AN device, and wherein the logical access loop identifier is coded based on a logic chassis number, rack number, frame number, slot number, sub-slot number, and port number on the virtual EN.

* * * * *